(12) United States Patent
Ding et al.

US008432435B2

(10) Patent No.: US 8,432,435 B2
(45) Date of Patent: Apr. 30, 2013

(54) RAY IMAGE MODELING FOR FAST CATADIOPTRIC LIGHT FIELD RENDERING

(75) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 13/207,224

(22) Filed: Aug. 10, 2011

(65) Prior Publication Data

US 2013/0038696 A1  Feb. 14, 2013

(51) Int. Cl.
*H04N 7/12* (2006.01)
(52) U.S. Cl.
USPC .................. 348/47; 348/42; 348/43; 348/46; 348/48; 348/51
(58) Field of Classification Search .................. 348/42, 348/43, 46–48, 51
See application file for complete search history.

(56) References Cited

U.S. PATENT DOCUMENTS

| | | |
|---|---|---|
| 4,177,505 A | 12/1979 | Carel |
| 6,097,394 A | 8/2000 | Levoy et al. |
| 7,901,093 B2 * | 3/2011 | Tan et al. ....................... 353/121 |
| 2003/0206652 A1 * | 11/2003 | Nister ............................ 382/154 |
| 2010/0123784 A1 | 5/2010 | Ding et al. |

OTHER PUBLICATIONS

Ding, Y., et al., "Multiperspective Stereo Matching and Volumetric Reconstruction", Computer Vision., IEEE, 12th 2009 Conference, pp. 1827-1834.
Yu, J., et al., "General Linear Cameras", Computer Vision—ECCV 2004, Lecture notes in Computer Science, vol. 3022/2004, pp. 14-27.
Taguchi, Y., et al., "Axial-Cones: Modeling Spherical Catadioptric Cameras for Wide-Angle Light Field Rendering", ACM Transactions on Graphics (TOG), Proceedings of ACM SIGGRAPH Asia 2010, vol. 29, Issue 6, Dec. 2010.

* cited by examiner

*Primary Examiner* — Sath V Perungavoor
*Assistant Examiner* — Geepy Pe

(57) ABSTRACT

A catadioptric camera creates image light fields from a 3D scene by creating ray images defined as 2D arrays of ray-structure picture-elements (ray-xels). Each ray-xel captures light intensity, mirror-reflection location, and mirror-incident light ray direction. A 3D image is then rendered from the ray images by combining the corresponding ray-xels.

20 Claims, 28 Drawing Sheets

FIG 11A  FIG 11B

RAY IMAGE MODELING FOR FAST CATADIOPTRIC LIGHT FIELD RENDERING

BACKGROUND

1. Field of Invention

The present invention relates to the field of catadioptric cameras. More specifically, the present invention relate to the use of a catadioptric camera to capture a light field of a real-world scene.

2. Description of Related Art

Computer generated three dimensional, i.e. 3D, images are desirable in various applications, such as research and entertainment. There are various methods of rendering 3D images. For example, a scene consisting of geometric primitives composed of different materials and a set of lights may be input to a three-dimensional graphics system, which then computes and renders an output image based on this information. This approach, however, is very computer and labor intensive.

An alternate approach, which may be termed image-based rendering, generates different, i.e. new, views of an environment based on a set of existing, pre-acquired images. This approach may be used to render 3D images from a collection of two dimensional, i.e. 2D, images. Indeed, reconstruction of 3D scenes from multiple 2D views is probably one of the most explored problems in computer vision. This typically requires that the processing device be able to match corresponding objects in two or more images of a common scene. Classical stereo matching algorithms then use the pinhole camera model to infer depth.

In the field of computer vision, this matching of objects (or object features or feature points) common to two or more images is often termed correspondence matching (or the correspondence problem). Correspondence matching tries to figure out which parts of a first image correspond to (i.e. are matched to) which parts of a second image, assuming that the second image was taken after the camera that took the first image had moved, time had elapsed, and/or the pictured objects had moved. For example, the first image may be of a real-world scene taken from a first view angle with a first field-of-vision, FOV, and the second image may be of the same scene taken from a second view angle with a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 1, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

FIG. 1 illustrates a horizontal parallax where, from the view point of camera 11, smaller sphere 21 appears to be in front of larger sphere 19 (as shown in 2D image 15), but from the view point of camera 13, smaller sphere 21 appears to be some distance to the side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar, or stereo, constraints are known.

Epipolar geometry is based on the pinhole camera model, a simplified representation of which is shown in FIG. 2. In the pinhole camera model, cameras are represented by a point, such as left point $O_L$ and right point $O_R$, at each respective camera's focal point. Point $P_O$ represents the point of interest (i.e. an object) in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal $O_L$ to point $P_O$, is seen as a single point $P_L$ in virtual image plane ImgL, because point $P_O$ is directly in front of focal point $O_L$. This is similar to how in image 15 of FIG. 1, smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 1, smaller sphere 21 appears to be displaced to the side of larger sphere 19. This displacement line 33 may be termed an epipolar line. Conversely from focal point $O_R$, line 29 is seen as a single point $P_R$ in virtual image plane ImgR, but from focal point $O_L$ line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must projects onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Epipolar geometry also forms the basis for homography, i.e. projective transformation. Homography describes what happens to the perceived positions of observed objects when the point of view of the observer changes. An example of this is illustrated in FIG. 3, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e. point registration). For example, the four corners A, B, C and D of square 12 correspond to points A', B', C' and D' in image projection 14, and correspond to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

For example in FIG. 4, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image, as shown in image 32. Thus, automatically finding correspondence between pairs of images is the classic problem of stereo vision, but unfortunately the available algorithms to achieve this task may not always find the correct correspondences.

Another method of creating and manipulating 3D images (particularly in the area of computer vision) is the use of voxels. A voxel (i.e. volumetric pixel or volumetric picture element) is a volume element, representing a value on a regular grid in three dimensional space similar to how a pixel represents a value on a two dimensional space (i.e. a bitmap). Voxels are frequently used in the visualization and analysis of medical and scientific data, as well as representation of terrain in video games and computer simulations.

An example of a voxel representation of a 3D image is shown in FIG. 5A. Teapot TB is a voxel representation of teapot TA. A volume containing voxels can be visualized either by direct volume rendering or by the extraction of polygon iso-surfaces which follow the contours of given threshold values. Irrespective of how the voxels are defined, voxels generally contain volumetric information that facilitates the manipulation of 3D images. The resolution of a voxel representation is determined by the size of the voxel. For example, FIG. 5B shows a higher resolution voxel image TC of teapot TA. Some volumetric displays thus use voxels to describe their resolution. For example, a display might be able to show 512×512×512 voxels. The higher the voxel resolution, the more detailed the 3D representation.

Another method of rendering perspective representations of 3D objects is through direct capture the light field around an object. The light field is a function that describes the amount of light traveling in every direction through every point in space. With reference to FIG. 6, if the concept is restricted to geometric optics, i.e. to incoherent light and to objects larger than the wavelength of light, then the fundamental carrier of light is a light ray, or ray. The measure for the amount of light traveling along a ray is radiance, denoted by L and measured in watts (W) per steradian (sr) per meter squared ($m^2$). The steradian is a measure of solid angle, and meters squared are a measure of cross-sectional area.

The radiance along all such rays in a region of three-dimensional space illuminated by an unchanging arrangement of lights is called the plenoptic function. The plenoptic illumination function is an idealized function used in computer vision and computer graphics to express the image of a scene from any possible viewing position at any viewing angle at any point in time. Since rays in space can be parameterized by three coordinates, x, y, and z and two angles $\theta$ and $\phi$, as illustrated in FIG. 6B, it is a five-dimensional function, although higher-dimensional functions may be obtain if one considers time, wavelength, and polarization angle as additional variables.

The light field may also be treated as an infinite collection of vectors, one per direction impinging on a point, with lengths proportional to their radiances. Integrating these vectors over any collection of lights, or over the entire sphere of directions, produces a single scalar value—the total irradiance at that point, and a resultant direction. For example, FIG. 6C shows two light rays $r_A$ and $r_B$ emanating from two light sources $I_A$ and $I_B$, and impinging on point P'. Light rays $r_A$ and $r_B$ produce vectors $D_A$ and $D_B$, and these vectors combine to define vector D', which specifies the total irradiance at point P'. The vector-valued function in a 3D space may be called the vector irradiance field, and the vector direction at each point in the field can be interpreted as the orientation one would face a flat surface placed at that point to most brightly illuminate it.

For practical application in the field of computer graphics, however, it is beneficial to reduce the number of dimensions used to describe a light field. If locations in a 3D scene are restricted to outside a convex hull of an object (i.e. the subject under study), such as if the object was shrink-wrapped, the light function would then contain redundant information because the radiance along a ray remains constant from point to point along its length path until it collides with the object. It has been found that the redundant information is one dimension, leaving a four-dimensional function. This function is sometimes termed the photic field, 4D light field or Lumigraph. Formally, the 4D light field is defined as radiance along rays in empty space. Using this reduced dimensional definition, the plenoptic function can be measured using a digital camera. A fuller explanation of this is provided in U.S. Pat. No. 6,097,394 to Levoy, herein incorporated in its entirety by reference.

Levoy explains that the set of rays in a light field may be parameterized using two-plane parameterization, as illustrated in FIG. 6D. This parameterization has the advantage of relating closely to the analytic geometry of perspective imaging, as explained above. Indeed, a simple way to think about a two-plane light field is as a collection of perspective images of the st plane (and any objects that may lie astride or beyond it), each taken from an observer position on the uv plane. A light field parameterized this way is sometimes called a light slab. An example of this is shown in FIG. 7A. In this case, a plurality of cameras C1 to Cn on the uv plane create a light slab LS by providing multiple views (i.e. perspective images) of the st plane.

In computer graphics, light fields are typically produced either by rendering a 3D model or by photographing a real scene. In either case, to produce a light field, multiple views must be obtained from a large collection of viewpoints. Depending on the parameterization employed, this collection will typically span some portion of a line, circle, plane, sphere, or other shape. For example in FIG. 7B, four light slaps LS1 to LS4 are used to capture a light field around a cylinder C at its center. Thus, capturing a light field photographically requires many images from various view angles and intricate setups. This often complicates the creation of light fields, especially for everyday use.

As discussed above, there are multiple approaches towards rendering 3D images in computer applications. But because of the versatility of light fields (such as the ability to change the view point and the focal point of a rendered 3D image) and their ability to be created by use of captured digital images, light fields are of particular interest. However, the use of light fields is complicated by their need for a plurality of digital images of a 3D subject taken from various view angles.

One method of reducing the number of imaging devices (or the number of times a single imaging device is repeatedly used) to generate multiple images from various view angle is the use of catadioptric cameras. Catadioptric cameras, or systems, can image a subject from a wider field of vision than pinhole cameras and thus reduce the need for multiple images from different FOVs. Catadioptric camera systems, however, do not fall under the pinhole camera model. Consequently, they are not subject to epipolar geometry, upon which the above described 3D rendering methods are based. This makes catadioptric cameras systems ill-suited for the above-described methods of generating 3D images. One may attempt applying pinhole model methods directly, as described above, to catadioptric cameras, but the results will have inherent errors, tend to exhibit distortions and not be optimal.

An object of the present invention is to provide a simple and economic method of capturing light fields.

Another object of the present invention is to reduce the number of cameras needed for rendering perspective images from 2D captured images.

Still another object of the present invention is to provide a method for utilizing catadioptric systems in the capturing of light fields and in the creation of 3D images.

SUMMARY OF INVENTION

The above objects are met in a catadioptric camera system, having: a plurality of curved mirrors arranged into a mirror array for reflecting a desired 3D scene; a digital imaging system for capturing ray images of the curved mirrors, each of the ray images being a two-dimensional array of ray-structure picture-elements (ray-xels), each respective ray-xel including a light intensity measure according to a predefined color model, mirror-reflection location coordinates, and mirror- incident ray direction coordinates, wherein: the light intensity measure is indicative of the light intensity received at the respective ray-xel; the mirror-reflection location coordinates are indicative of a surface location on a corresponding curved mirror from which a reflected light ray travels from the corresponding curved mirror to the respective ray-xel, the reflected light ray being a reflection of an incident light ray from a point in the 3D scene to the surface location; and the mirror-incident ray direction coordinates are indicative of a vector direction of the incident light ray from the point in the 3D scene to the surface location.

Preferably in this catadioptric camera system, the digital imaging system includes a pinhole camera. Alternatively, the digital imaging system is a pinhole camera. Further alternatively, the digital imaging system includes a pinhole camera in communication with a processing device.

Preferably the above catadioptric camera system is non-central. That is, curved mirrors have arbitrary curvatures.

Additionally, the predefined color model is an RGB color model.

The present digital imaging system may render a light field for the point in the 3D scene by combining information from the ray-xels that corresponds to the point in the 3D scene. In one embodiment, the mirror-incident ray direction information of each ray-xel is combined in the formation of the light field.

Alternatively, the digital imaging system renders a light field image of the 3D scene by combining all the ray-xel information of all ray-xels in the ray images that correspond to each other.

Additionally, the digital imaging system may render a depth-map from the 2D ray images by: (a) rendering a depth-of-field image by combining ray-xel information from corresponding ray-xels in the captured ray images; (b) rendering a perspective image for a selected one of the curved mirrors; (c) recovering a depth-map using a graph-cut technique; and (d) post-processing the depth-map by guided filtering using the rendered perspective image as the guide.

In this case, step (c) may include: defining a search domain for each ray-xel in a first ray image as a window of height $2\epsilon$ and width $d_{max}^x$ in a second ray image, where $d_{max}^x$ is a maximum horizontal disparity and $\epsilon$ is an elongation distortion on the second ray image of a point p in the first ray image; defining the energy function for a specific labeling f as:

$$E(f)=E_d(f)+E_{occ}(f)+E_s(f)+E_{reproj}(f)$$

where $E_d$ is a data term to measure color consistency, $E_{occ}$ is an occlusion term, $E_s$ is a smoothness term, and $E_{reproj}$ defines a re-projection error as $$E_{reproj}(d_x, d_y) = \sum\sum_{u\ v} Dreproj(p, p+[dx, dy]) \text{ and } \sum\sum_{u\ v} Dreproj(p, p+[dx, dy])$$

determines the sum of the closest distances from point p to p+[dx,dy] for all points in a ray image.

The above objects are also met in a method of rendering a light field in a catadioptric camera, having: providing a plurality of curved mirrors arranged into a mirror array for reflecting a desired 3D scene; providing a digital imaging system for capturing ray images of the curved mirrors, each of the ray images being a two-dimensional array of ray-structure picture-elements (ray-xels), each respective ray-xel including a light intensity measure according to a predefined color model, mirror-reflection location coordinates, and mirror-incident ray direction coordinates, wherein: the light intensity measure is indicative of the light intensity received at the respective ray-xel; the mirror-reflection location coordinates are indicative of a surface location on a corresponding curved mirror from which a reflected light ray travels from the corresponding curved mirror to the respective ray-xel, the reflected light ray being a reflection of an incident light ray from a point in the 3D scene to the surface location; and the mirror-incident ray direction coordinates are indicative of a vector direction of the incident light ray from the point in the 3D scene to the surface location; and render a light field for the point in the 3D scene by combining information from the ray-xels that corresponds to the point in the 3D scene.

In this approach, the mirror-incident ray direction information of each ray-xel is combined in the formation of the light field. In one embodiment, the 3D scene is rendered by combining the ray-xel information of all ray-xels in the ray images that correspond to each other.

Preferably, the catadioptric camera system is non-central. That is, the curved mirrors have arbitrary curvatures.

Also preferably, the predefined color model is an RGB color model.

Further preferably, the digital imaging system further renders a depth-map from the ray images by: (a) rendering a depth-of-field image by combining ray-xel information from corresponding ray-xels in the captured ray images; (b) rendering a perspective image for a selected one of the curved mirrors; (c) recovering a depth-map using a graph-cut technique; and (d) post-processing the depth-map by guided filtering using the rendered perspective image as the guide.

Preferably in this approach, step (c) includes: defining a search domain for each ray-xel in a first ray image as a window of height $2\epsilon$ and width $d_{max}^x$ in a second ray image, where $d_{max}^x$ is a maximum horizontal disparity and $\epsilon$ is an elongation distortion on the second ray image of a point p in the first ray image; defining the energy function for a specific labeling f as:

$$E(f)=E_d(f)+E_{occ}(f)+E_s(f)+E_{reproj}(f)$$

where $E_d$ is a data term to measure color consistency, $E_{occ}$ is an occlusion term, $E_s$ is a smoothness term, and $E_{reproj}$ defines a re-projection error as $$E_{reproj}(d_x, d_y) = \sum_u\sum_v Dreproj(p, p+[dx, dy]) \text{ and } \sum_u\sum_v Dreproj(p, p+[dx, dy])$$

determines the sum of the closest distances from point p to p+[dx,dy] for all points in a ray image.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 11A to 11C compare results obtained with the catadioptric camera of FIG. 10A.

DESCRIPTION OF THE PREFERRED EMBODIMENTS

Correspondence matching is an essential problem in computer vision, especially in stereo, view synthesis, and 3D reconstruction. Indeed, stereo matching is probably the most studied 3D scene reconstruction method in computer vision. Most existing approaches assume that the input cameras are perspective cameras, which provide a single, comparatively narrow perspective view. And since use of perspective cameras, which are defined by the pinhole camera model, is typically assumed, most research efforts have focused on handling issues unrelated to different camera models. For example, most research has focused on textures, noise, specularity, and occlusion boundaries. These methods assume the existence of epipolar geometry, which permits two images to be rectified to have a pure horizontal parallax, and thus are subject to the stereo constraint.

Recently, interest in 3D reconstruction using multi-perspective cameras has been growing. Multi-perspective cameras provide a wider perspective view than is possible with pinhole cameras, and/or provide multiple simultaneous perspective views. Unfortunately, multi-perspective cameras typically do not adhere to the pinhole cameras model. Consequently, a pair of multi-perspective cameras would not satisfy the epipolar constraint, and thus the 3D reconstruction techniques developed for pinhole cameras are generally not directly transferable to multi-perspective cameras.

Catadioptric cameras are a type of multi-perspective camera and thus do not adhere to the pinhole camera model. Consequently, a strict stereo constraint may not exist for such cameras. Catadioptric optical systems combine refraction and reflection in an optical system by means of lenses (dioptrics) and curved mirrors (catoptrics). Multi-perspective catadioptric cameras (or camera system/setups), have an advantage of a wider field of vision, FOV, than is achievable with pinhole camera model setups.

Figure 1:
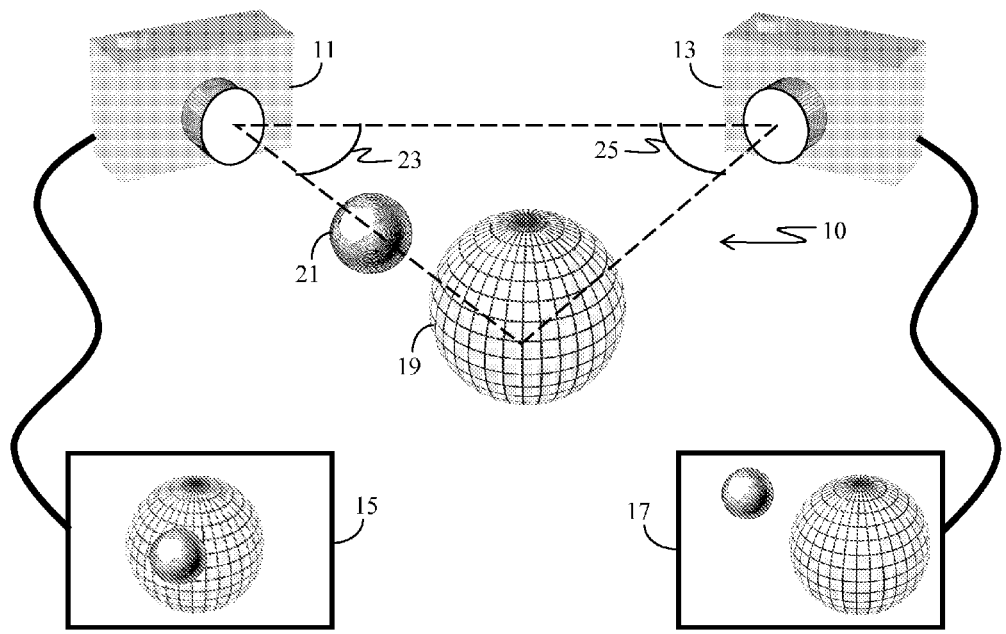
FIG. 1 illustrates a horizontal parallax as the basis for the epipolar stereo model.
Figure 2:
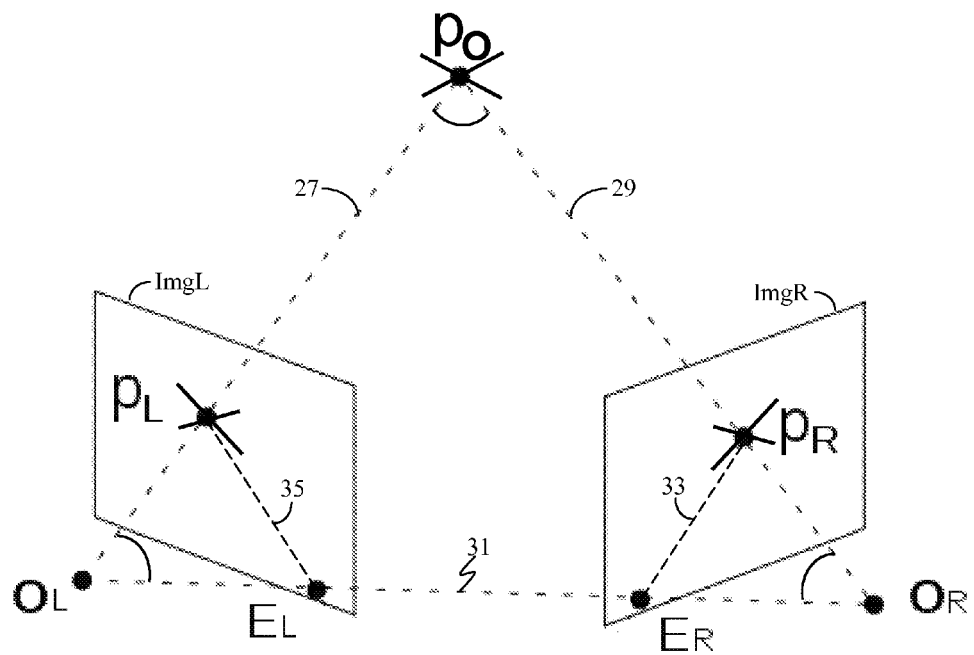
FIG. 2 is a simplified application of epipolar geometry to describe the stereo constraint.
Figure 3:
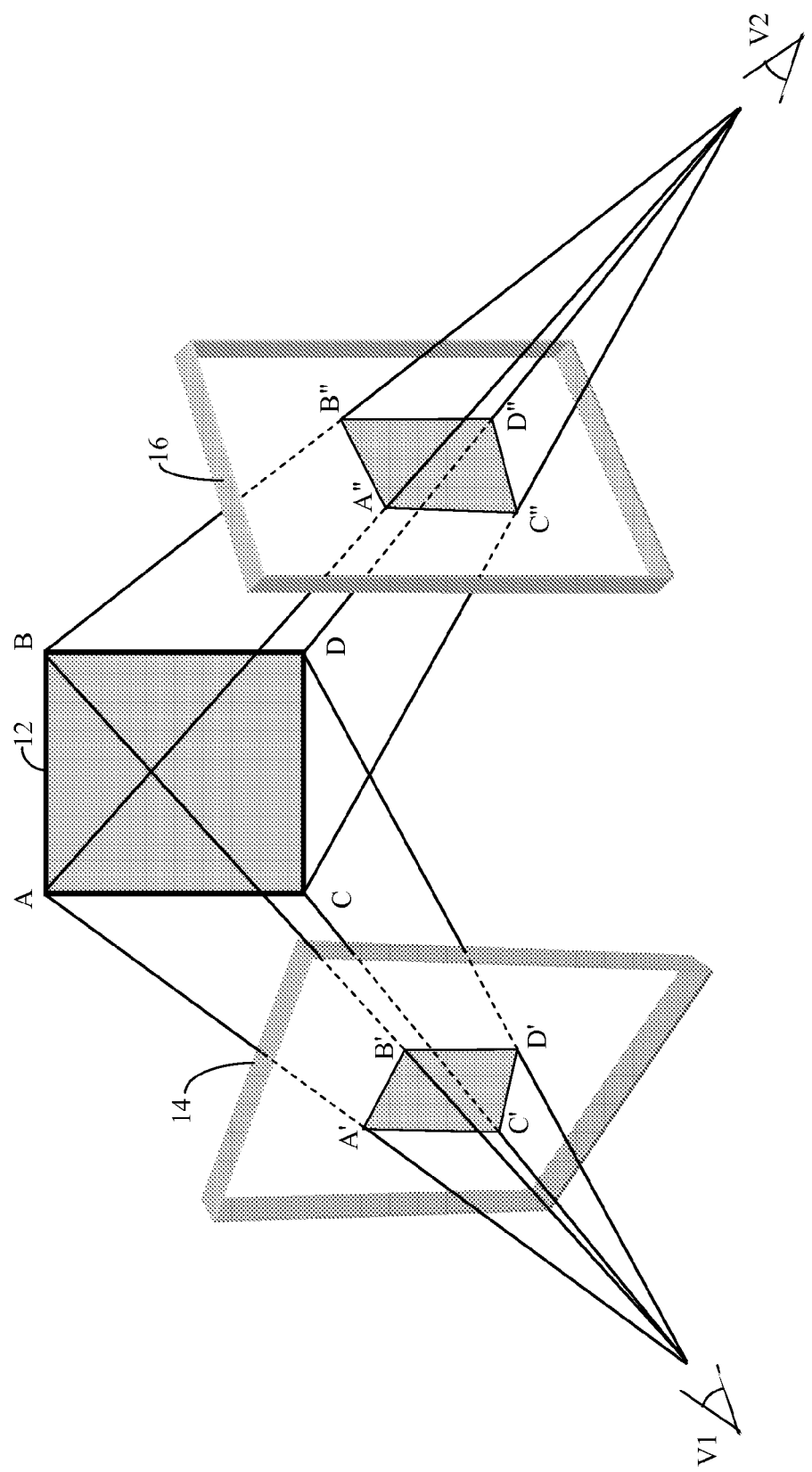
FIG. 3 illustrates the principle of homography.
Figure 4:
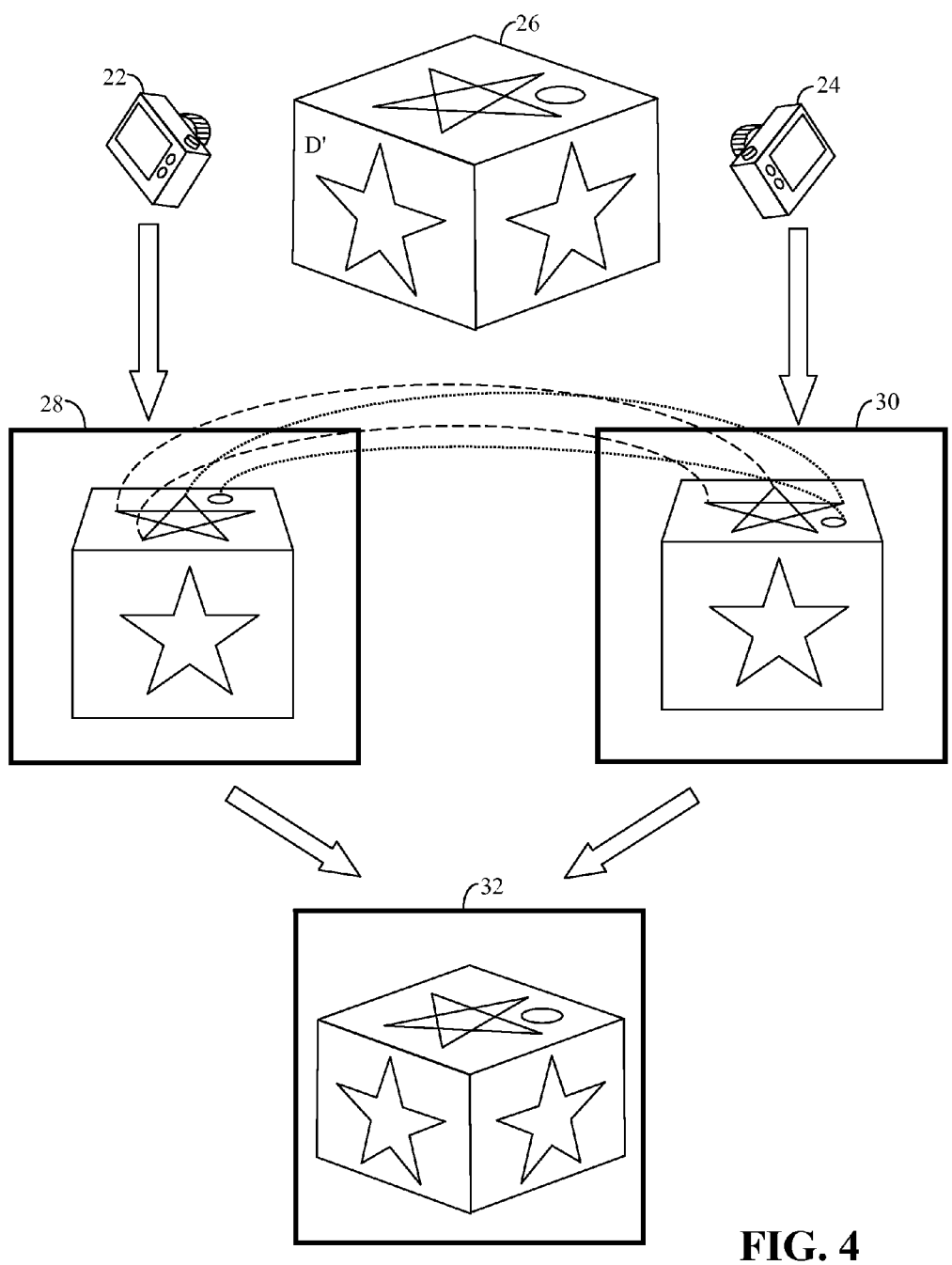
FIG. 4 illustrates the use of homography to render a 3D image from two 2D images.
Figure 5A:
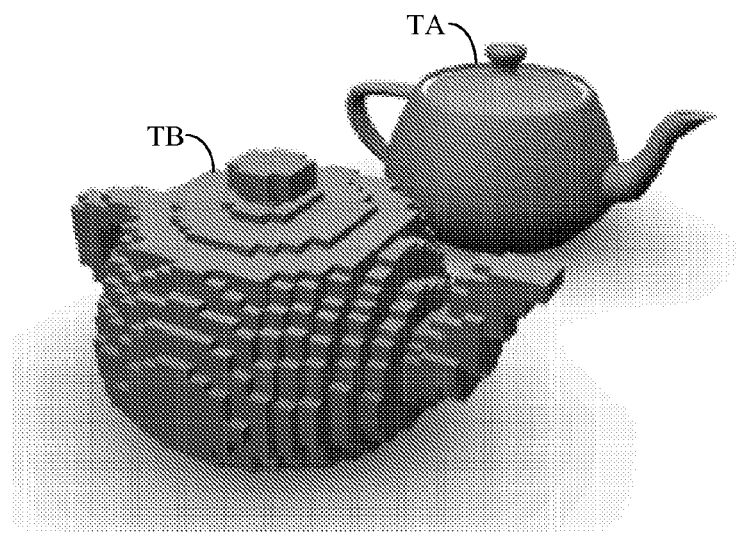
FIGS. 5A and 5B illustrate voxels.
Figure 5B:
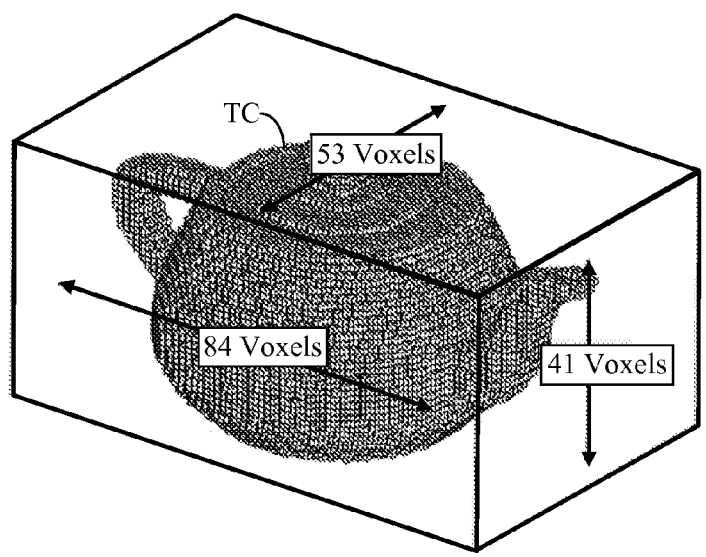
Figure 6A:
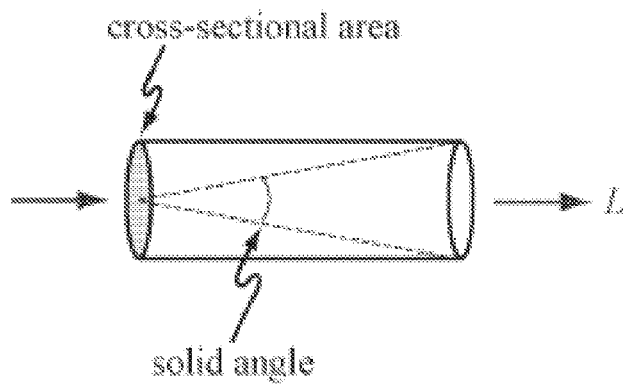
FIGS. 6A to 6D illustrates the principles of light fields.
Figure 6B:
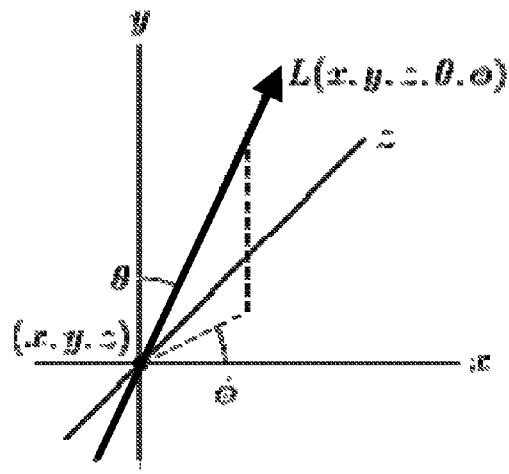
Figure 6C:
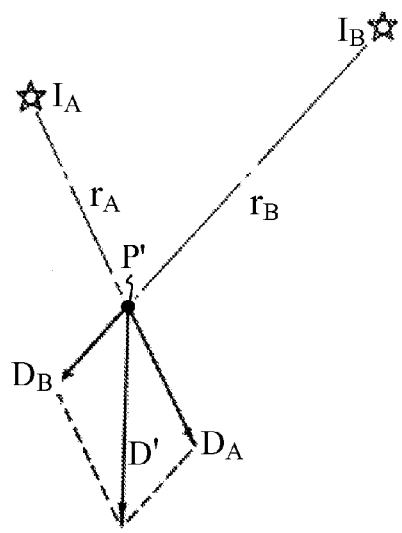
Figure 6D:
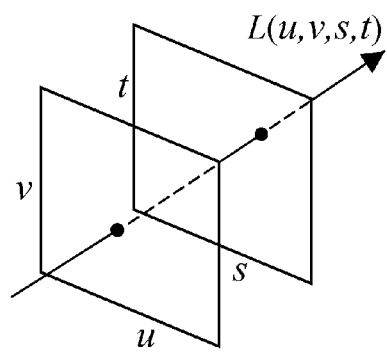
Figure 7A:
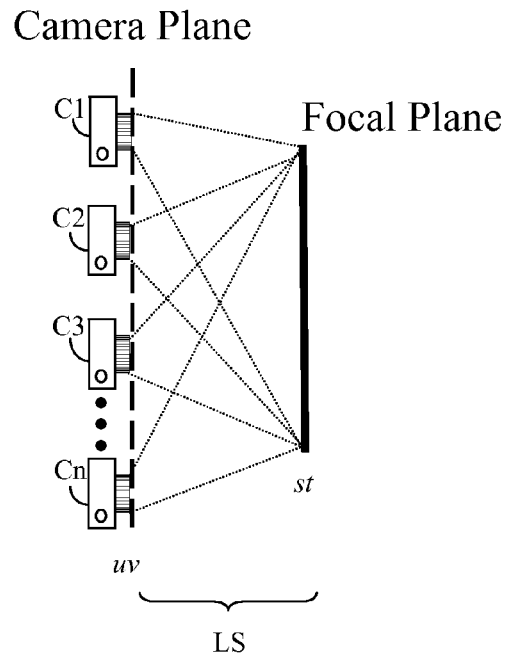
FIGS. 7A and 7B illustrate methods of creating light fields.
Figure 7B:
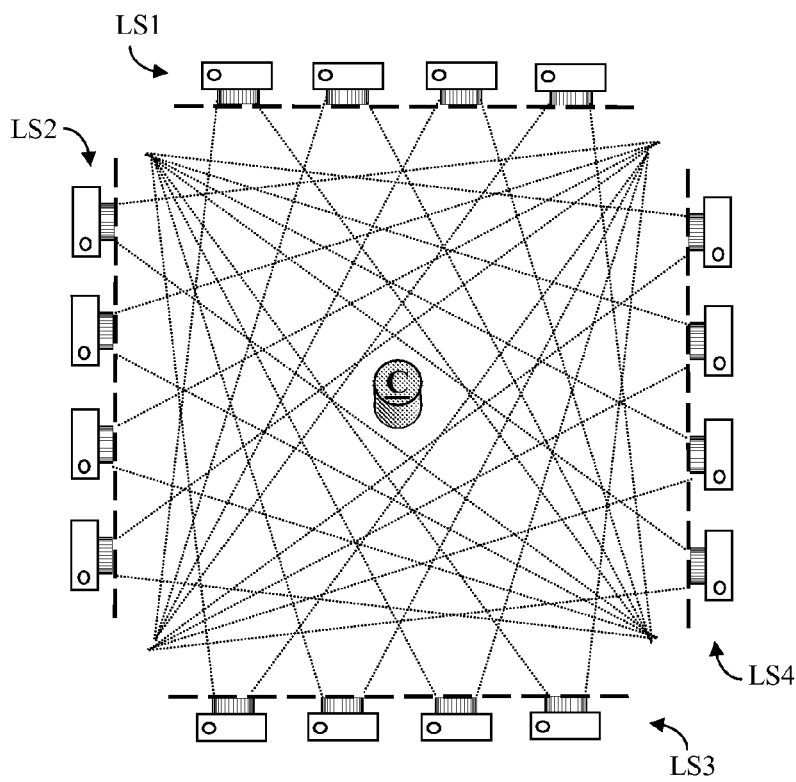
Figure 8:
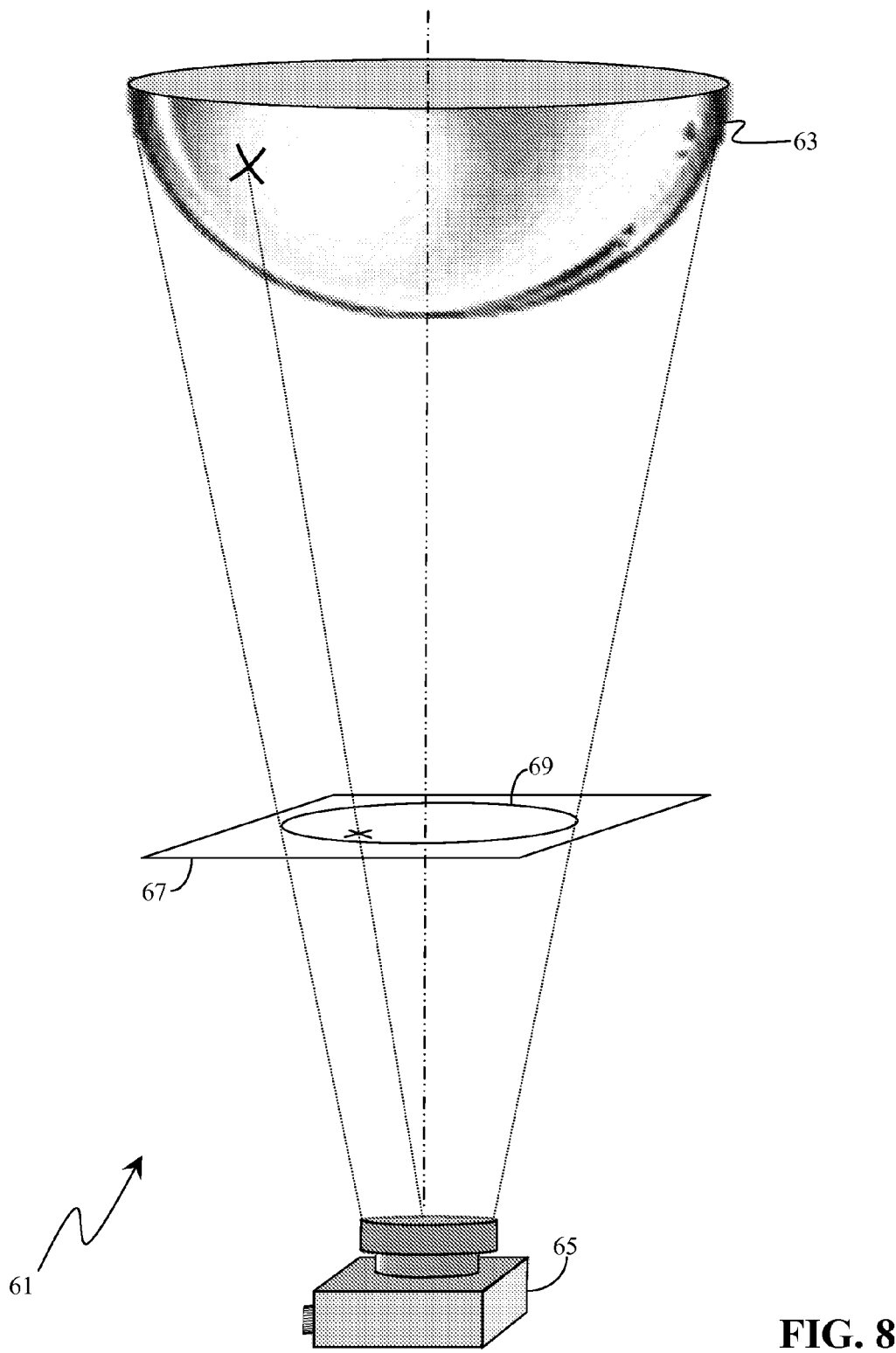
FIG. 8 illustrates a simplified example of a catadioptric camera setup.

A simplified example of a catadioptric camera setup 61 is shown in FIG. 8. A perspective camera 65 (or a single-perspective camera, such as a pinhole camera, for creating 2D perspective projection images of 3D scenes) combined with a curved mirror 63 constitutes a basic catadioptric (or catadioptric omnidirectional) camera. Curved mirror 63, which may be parabolic or hyperbolic, increases the field of vision of camera 65, but distorts the image captured by camera 65. For illustration purposes, a virtual image plane 67 is shown in front of camera 65 with a simplified projection outline 69. The simplified projection illustrates the center of a projected x-shaped maker from mirror 63 onto virtual image plane 67.

There are a few basic types of catadioptric cameras. With reference to FIG. 9A, a camera-mirror system is a central system when optical rays $71a$-$71d$ coming from a real-world scene to the camera 76 (represented by the camera's focal point) reflect on mirror 73 and intersect at a unique point 75, which constitutes a single effective view point. Intersection at unique point 75 can be achieved by giving mirror 73 a spherical shape.

Central catadioptric cameras can thus be characterized as having a spherical-dome-shaped mirror that produces a single effective viewpoint. Because of their single effective viewpoint (and thus uniform distortion), some prior art attempts have been made towards extending stereo properties to central catadioptric cameras by manipulating a captured image to compensate for the image distortion caused by curved mirror 73. However, such systems typically require that the camera and mirror axes be carefully aligned, and that the mirror be rotationally symmetrical (i.e. spherical) with respect to its axis. For the sake of completeness, examples of this approach are provided below, but their strict setup requirements limit their application.

Figure 9B:
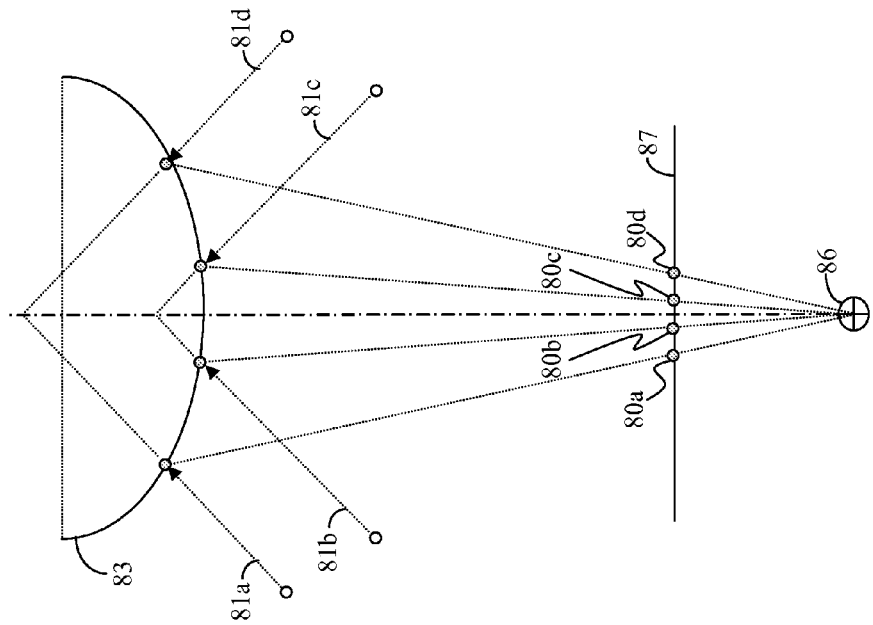
FIGS. 9A to 9C illustrate three types of catadioptric cameras.
Figure 9A:
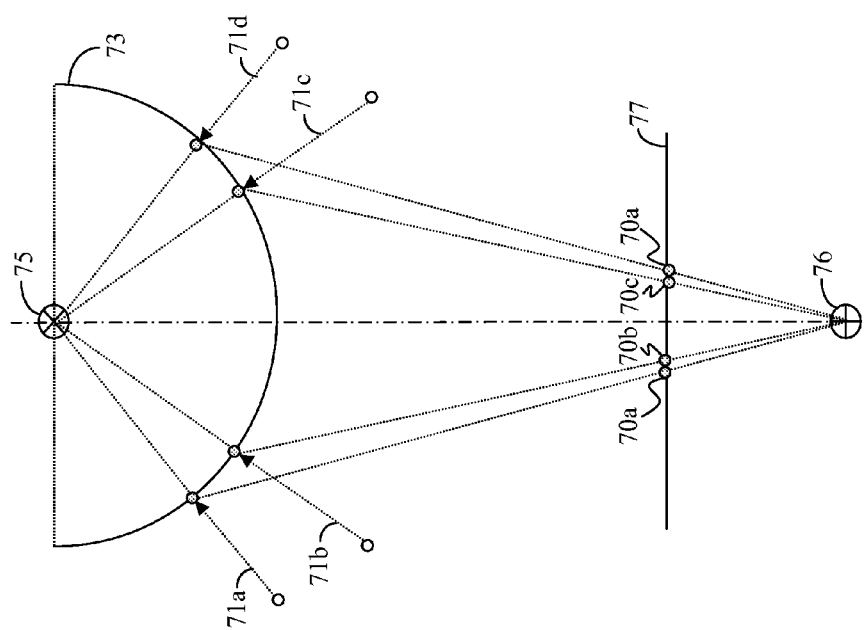

Another type of catadioptric camera is the non-central (i.e. non-single effective viewpoint) system, as illustrated in FIG. 9B. In this case, optical rays $81a$ to $81d$, coming from a real-world scene toward camera 86, reflect on mirror 83 and are not required to intersect at a unique point. Non-central catadioptric cameras would be easier and less costly to construct than central catadioptric camera due to their less stringent requirements, but non-central catadioptric cameras complicate any attempts to apply stereo constraints. It is worth noting that the projected points $70a$-$70d$ on the image plane 77 of central catadioptric camera 76 would be distorted differently than the projection points $80a$-$80d$ on the image plane 87 of non-central catadioptric camera 86, and thus applications designed for a central system such as shown in FIG. 9A would not generally be directly applicable to non-central systems, such as that of FIG. 9B or 9C.

Figure 9C:
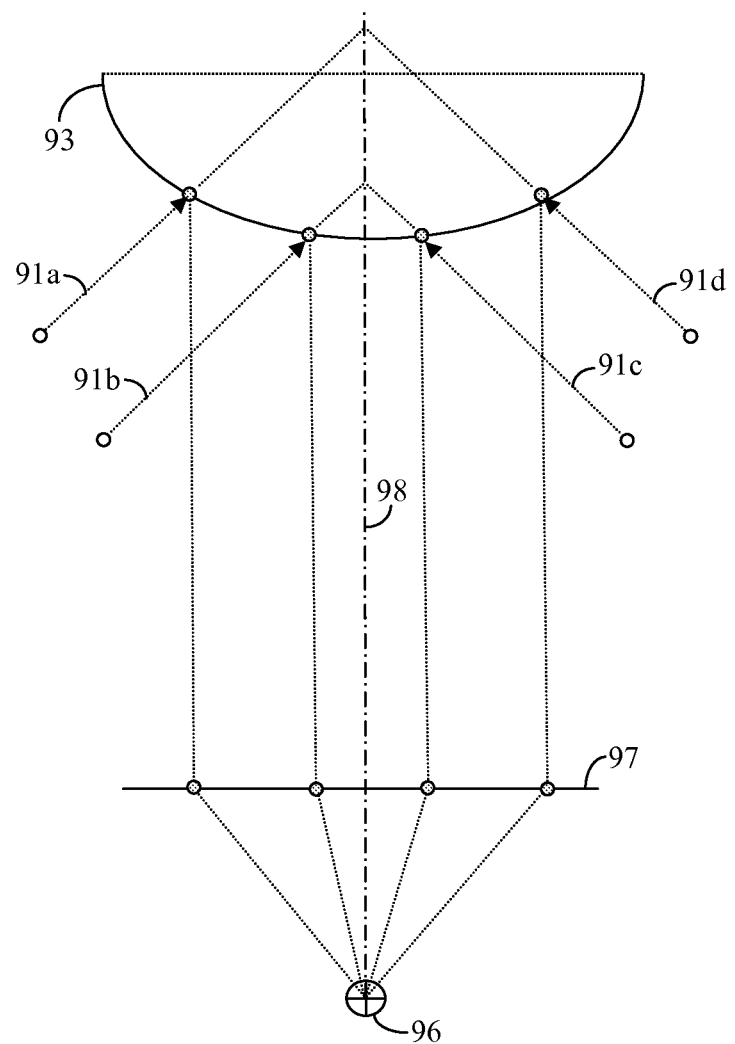

FIG. 9C illustrates another type of non-central system. In the system of FIG. 9C, reflected rays $91a$-$91d$ coming from a real-world scene to the camera 96 are parallel to the axis 98 of the mirror 93. Because the parallel rays $91a$-$91d$ do not converge towards the camera's optical center 96, an orthographic lens 97 would be placed between the camera and mirror 93 to focus the image on the camera's CCD plane at the camera's optical center 96.

In spite of the difficulties in analyzing (i.e. digital processing of) images from catadioptric cameras, the use of catadioptric cameras (including those having an array of adjacent curved mirrors) in automated systems is desirable because of their increased field of vision.

Figure 10B:
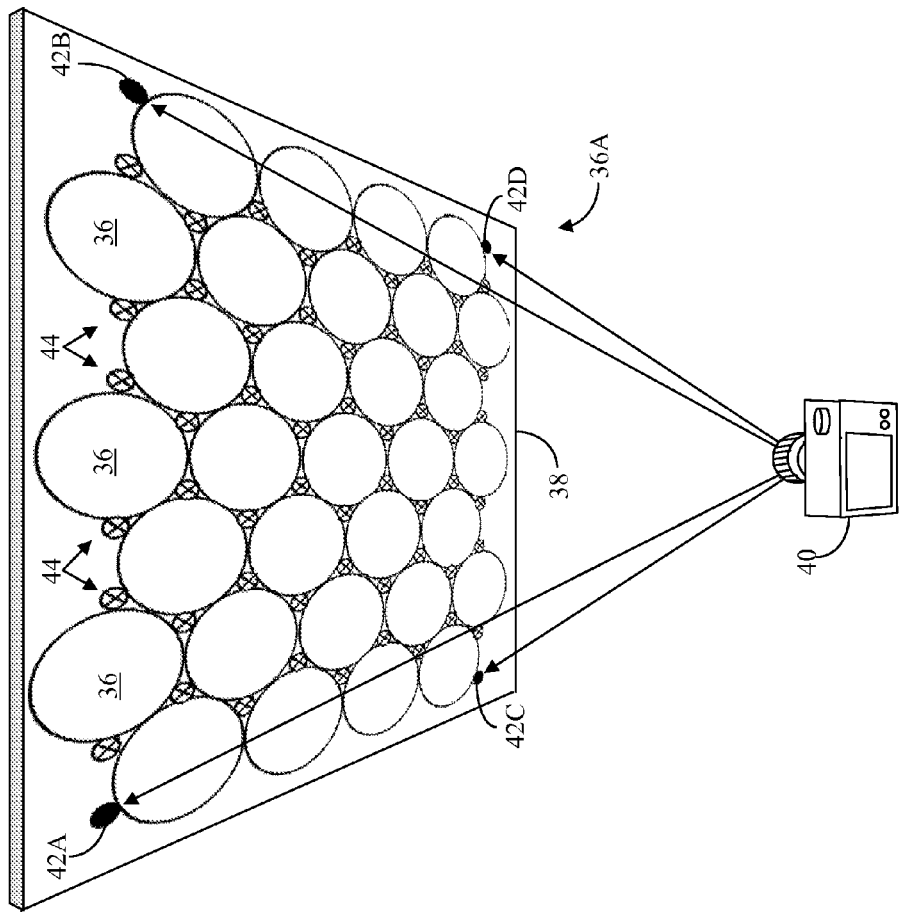
FIGS. 10A and 10B illustrate the use of homography in a catadioptric camera.
Figure 10A:
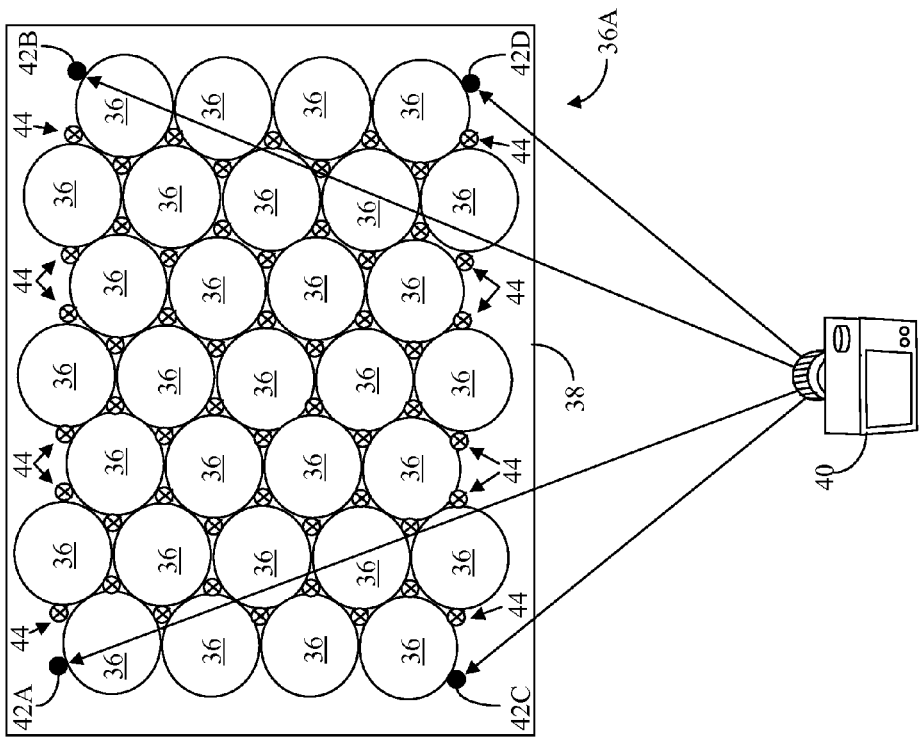

An example of the use of a central catadioptric camera in the creation of 3D images is shown in FIGS. 10A and 10B. With reference to FIG. 10A, a central catadioptric system is constructed by providing a pinhole camera 40 and a mirror array 36A of spherical mirrors 36 in a square arrangement supported on a support plane 38. Four corner markers 42A to 42D provide the outer perimeter of square mirror array 36A, and a plurality of internal markers 44 are provided between the spherical mirrors 36. The four outer markers are used to determine the orientation of camera 40 and support plane 38 relative to each other. Since the relative position of internal markers 44 and spherical mirrors 36 are known relative to corner markers 42A-42D, the position of the internal markers 44 are calculated and the relative positions of the mirrors 36 are thereby determined.

Pinhole-based homography is then used to compensate for the view angle of camera 40 relative to support plane 38, and thereby also provide compensation for the view angle camera 40 relative to mirror array 36A. For example, FIG. 10B illustrates an exaggerated tilt of support plane 38 relative to camera 40. But by means of identifying the four corner markers 42A-42D, and the use of homography, the view angle of camera 40 can be compensated and the relative positions of mirrors 36 established. This approach assumes that mirrors 36 are perfectly round and spherical (i.e. a central catadioptric system) and ignores mirror reflections in this calibration process.

Figure 11C:
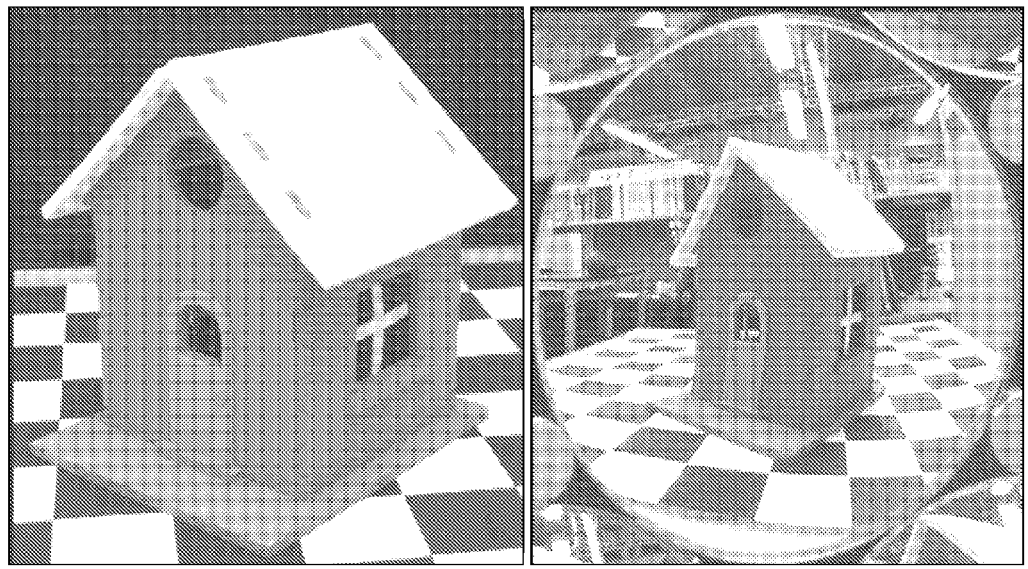

Examples of results obtained by this approach are illustrated in FIGS. 11A to 11C. FIG. 11A shows a sample subject, i.e. a bird house, to be imaged by the catadioptric system of FIG. 10A, and FIG. 11B illustrates an example of one image as viewed in one mirror 36 of mirror array 36A. The results of using homography to reconstruct a 3D image by combining the contribution of the different mirrors in mirror array 36A are shown in FIG. 11C. Since this approach makes a number of assumptions and ignores some of the distortion effects of curved mirrors, the resultant 3D reconstruction in FIG. 11C is a noisy image that exhibits some proportional distortion relative to true image 11A.

As is explained above, light fields captured using perspective cameras have been extensively studied and fast rendering algorithms have been developed for them. It would therefore be beneficial to combine the benefits of a catadioptric system with light field applications. In general, however, light field algorithms have been developed for perspective, i.e. pinhole-based, cameras, and such algorithms cannot be directly used for non-perspective catadioptric cameras.

However, an attempt at using a catadioptric system to capture a light field has been proposed in "Axial-Cones: Modeling Spherical Catadioptric Cameras for Wide-Angle Light Field Rendering", *SIGGRAPH ASIA,* 2010, by Taguchi et al. Like in the previous case of FIG. 10A, Taguchi et al.'s approach is also limited to central catadioptric systems to take advantage of the predictable distortion of perfectly rounded and spherical mirrors. Taguchi et al. simulate each spherical mirror as a series of virtual pinhole cameras, one after the other in series along a mirror's axis. The stereo techniques based on epipolar geometry can then be applied to the virtual pinhole cameras.

According to Taguchi et al., although catadioptric imaging systems are desirable because of their wide-angle imaging, they produce multi-perspective images that do not allow for algorithms designed for perspective (i.e. pinhole-based) cameras to be used. Efficient use catadioptric systems would require accurate geometric ray modeling as well as fast algorithms, and Taguchi et al. explain that such algorithms do not exist for general (and more specifically, non-central) catadioptric systems. Thus, in order to make use of existing pinhole based algorithms, Taguchi et al. propose modeling a central catadioptric camera as collections of what are called axial-cone cameras, each of which conforms to the pinhole camera model. Each spherical mirror would be modeled by a respective collection of axial-cone cameras. An example of this approach is illustrated in FIG. 12.

Figure 12B:
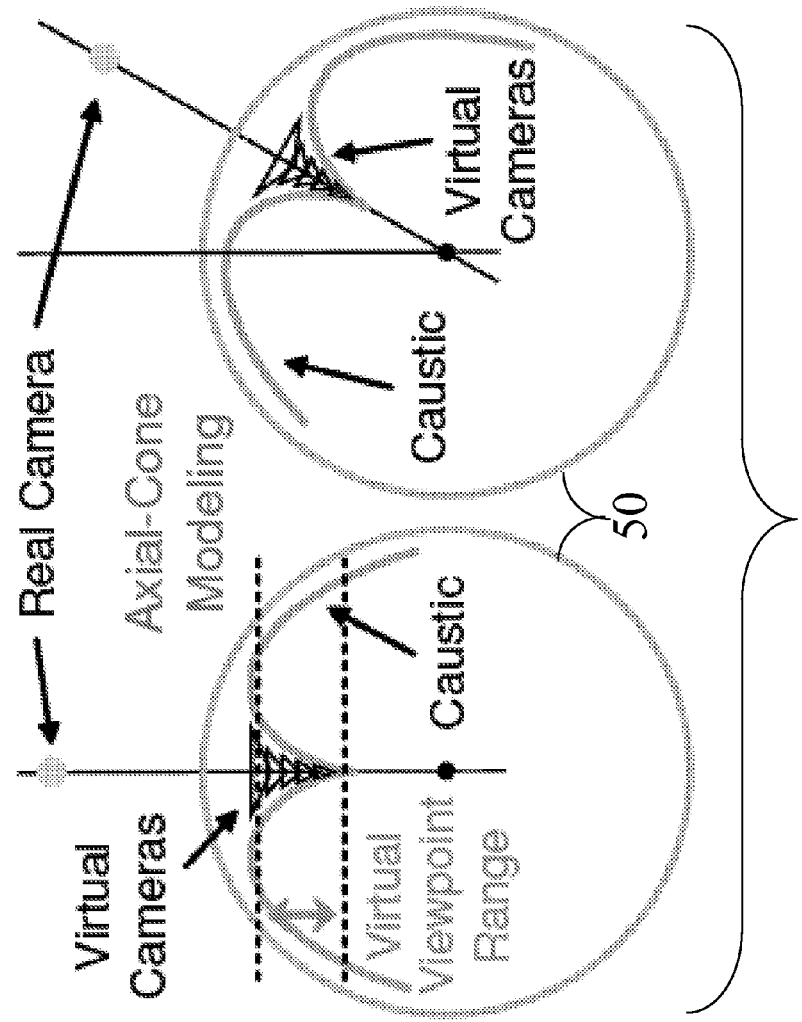
FIGS. 12A and 12B illustrate the principle of an approach to create a light field using a catadioptric camera.
Figure 12A:
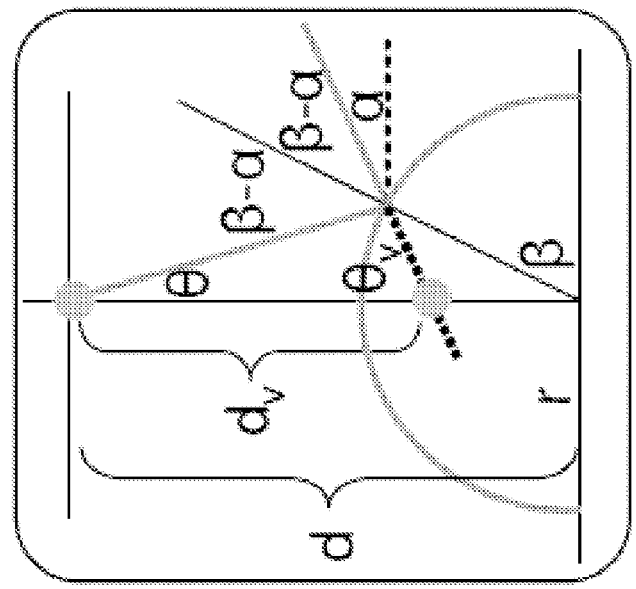

With reference to FIGS. 12A and 12B, geometry is used to model an axial cone for a spherical mirror, as shown in FIG. 12A. As shown in FIG. 12B, multiple virtual pinhole cameras are modeled along a specified axial cone direction of a spherical mirror 50. For each mirror, multiple virtual perspective cameras are modeled directed along a specified axis, each with a different cone of rays, and each mirror's specified axis defines a different view point. In this manner, existing pinhole-based, light field algorithms may be used with the multiple virtual perspective cameras.

Figure 13A:
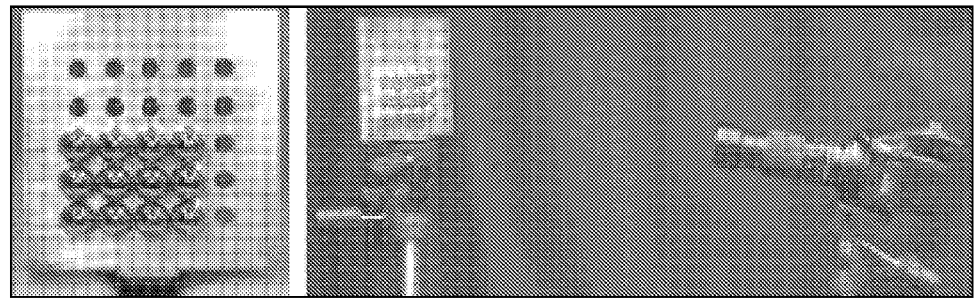
FIGS. 13A to 13C illustrate the setup and results of the catadioptric camera of FIGS. 12A and 12B.
Figure 13B:
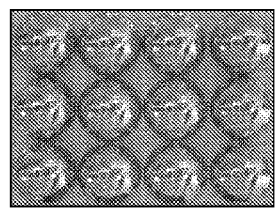
Figure 13C:
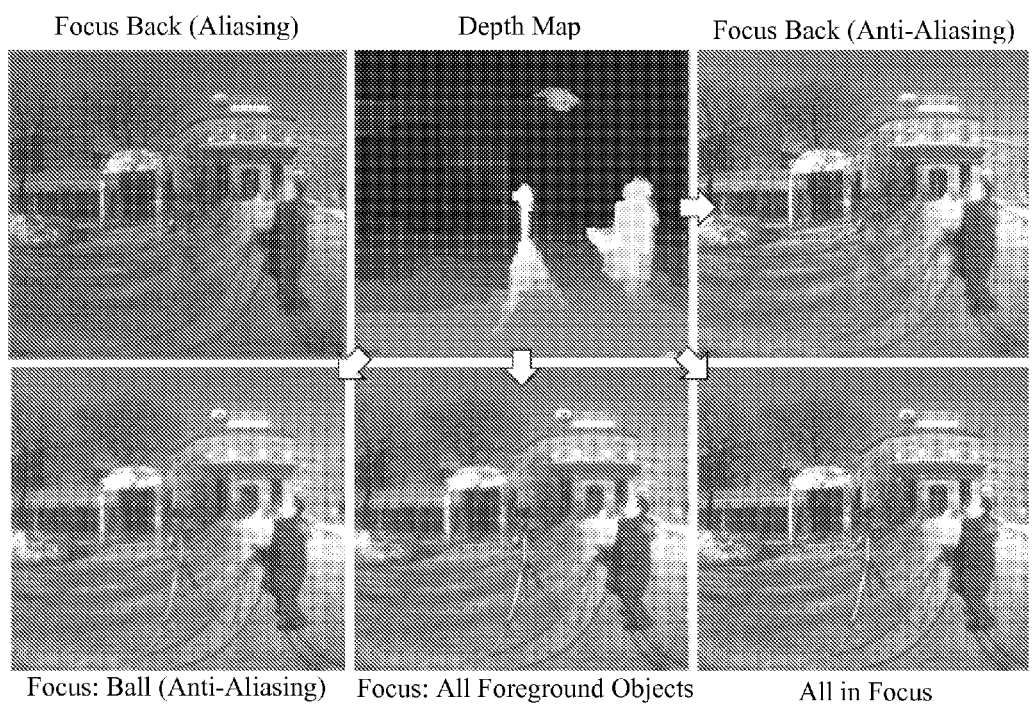

FIG. 13A shows a setup for the Taguchi et al.'s system, and FIG. 13B provides a closer look at the square-shaped array of spherical mirrors. FIG. 13C shows some results obtained with Taguchi et al.'s setup. Although the results do capture a usable light field, the results also demonstrate substantial distortion due to the curvature of the mirrors.

Figure 11C:
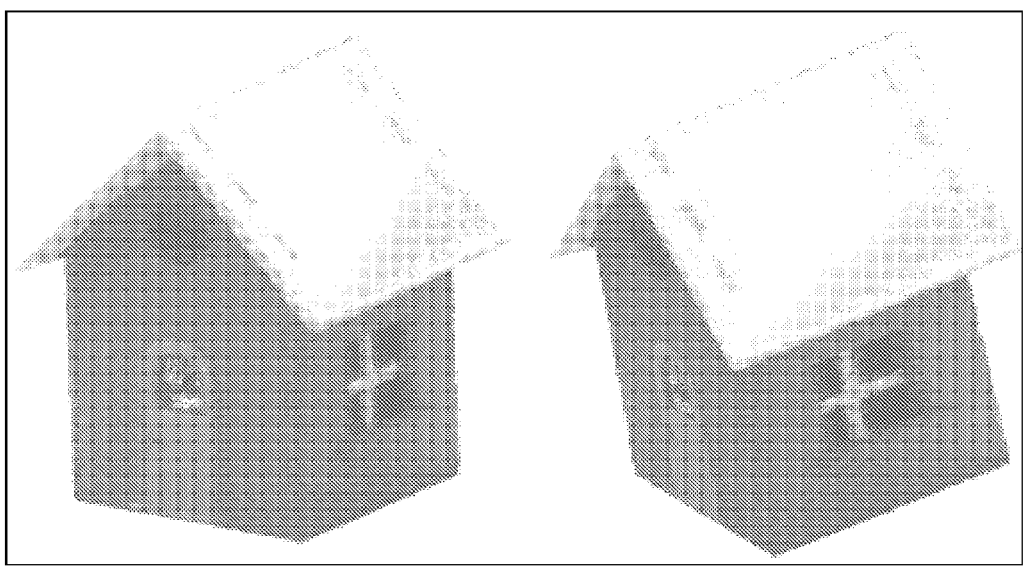

The above catadioptric setups are limited to central-catadioptric systems, and they attempt to apply epipolar geometry either directly as in the example of FIGS. 10 and 11 (while ignoring the inherent error due to catadioptric cameras not adhering to the stereo constraint) or indirectly as in the example of 12 and 13 (by simulating each curved mirror as a collection of virtual pinhole cameras along specified axial cone directions).

Another alternate approach to stereo matching is volumetric reconstruction, which as it is known in the art, may use methods such as space carving to first discretize a scene into voxels and then prune the voxels based on their visibility and consistency with the input images. Applicants have shown such an approach in "Multiperspective Stereo Matching and Volumetric Reconstruction" by Ding (an inventor of the present invention) et al., *Computer Vision*, 2009 *IEEE 12th International Conference*, Sep. 29, 2009-Oct. 2, 2009, pages 1827-1834, herein incorporated in its entirety by reference.

Since the pinhole camera model does not apply to multi-perspective cameras, Ding et al.'s approach utilizes the more generic General Linear Camera model, which as it is known in the art, can uniformly model many existing multi-perspective cameras (such as pushbroom and cross-slit cameras) as 2D affine subspaces of rays. First, each multi-perspective camera is decomposed into piecewise primitive General Linear Cameras or GLCs, which are used as a tool for first-order approximation of arbitrary multi-perspective cameras. This approach discretizes a scene into voxels and applies GLC back-projections to map each voxel onto the input multi-perspective cameras.

Figure 14A:
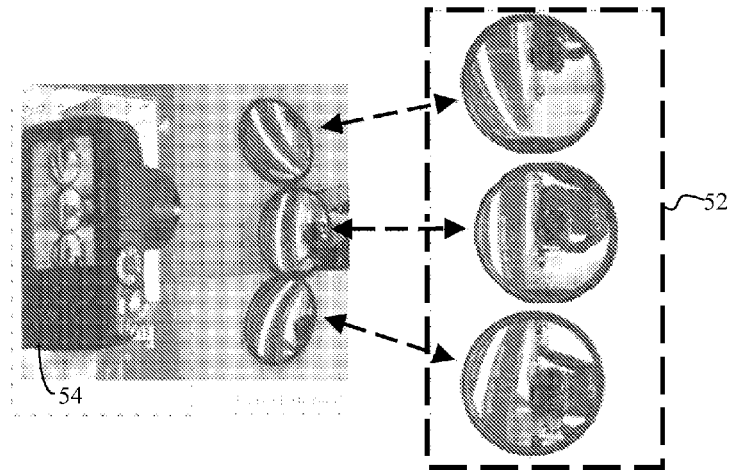
FIGS. 14A to 14C illustrate a setup for creating voxels using a catadioptric camera.
Figure 14B:
Figure 14C:
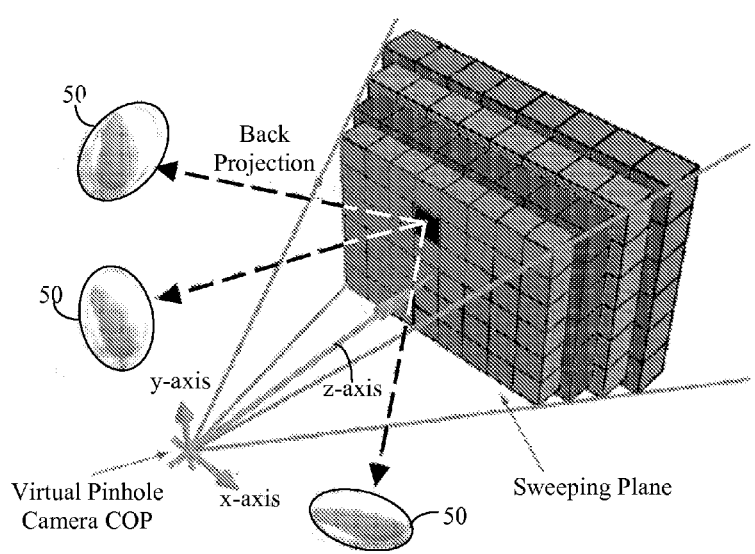

An example of this multi-perspective volumetric reconstruction to recover to 3D scene geometry from multiple multi-perspective camera images is shown in FIG. 14A. Multiple curved mirrors 52 are position in the scene and a camera 54 captures an image of these mirrors. To avoid uneven discretization of voxels characteristic of traditional pin-hole based methods, a virtual pinhole camera is first positioned between the multi-perspective cameras and then its viewing frustum volume is uniformly discretize in the projective space as shown in FIG. 14C. The voxels are then pruned based on their consistency with the input images and visibility.

To measure the color-consistency, the corresponding image of the voxel in each input camera is first determined. To achieve an accurate back-projection, each multi-perspective camera is decomposed into piecewise GLCs. This requires that a multi-perspective image be tessellated into triangles and that the associated ray at each vertex be found, as illustrated in FIG. 13B. Finally, the ray triplet from each triangle is treated as a GLC and the triangle plane is used as the default uv plane. An advantage of using this approximation is that GLCs provide closed-form projections.

A direct approach to use the GLC decomposition for back-projecting a voxel is to go through every GLC in the tessellation and compute the image of the voxel. The search stops when the projected voxel lies inside the GLC triangle. However, controlling the GLC tessellation level can be challenging: a fine tessellation produces more accurate approximation but also requires more computations.

A dynamic tessellation scheme similar to a level-of-detail (LOD) technique in computer graphics is therefore preferred. The multi-perspective camera is first tessellated using a coarse set of GLCs and standard 1-to-4 subdivision is performed and the subdivision is stored in a quad tree as shown in FIG. 14B. To back-project a 3D point to the camera, one starts with the top level GLCs and computes the image of the 3D point's projection. Which GLC contains the final projection is determined, and the search is repeated on its children GLCs. The search stops when one reaches the leave nodes. Typically, 4 to 5 subdivision levels are usually sufficient to accurately back-project a voxel on complex multi-perspective cameras.

This voxel approach, applies to arbitrary mirror surfaces, but introduces approximation using GLC decomposition. These approximations may introduce numerical errors and require complex computation.

The presently preferred embodiment is suitable for catadioptric cameras using mirrors of general shape (i.e. central and non-central catadioptric systems), and preferably optimizes the capture and definition of a light field. Preferably the captured light field is in a format making it suitable for existing GPU (graphic processing unit) processing.

In the preferred embodiment, this includes defining a novel digital image recording scheme. To achieve this, the present approach uses a vertical parallax stereo constraint (in addition to the horizontal parallax stereo constraint of epipolar geometry) to account for the distortion effects of catadioptric cameras.

Figure 15:
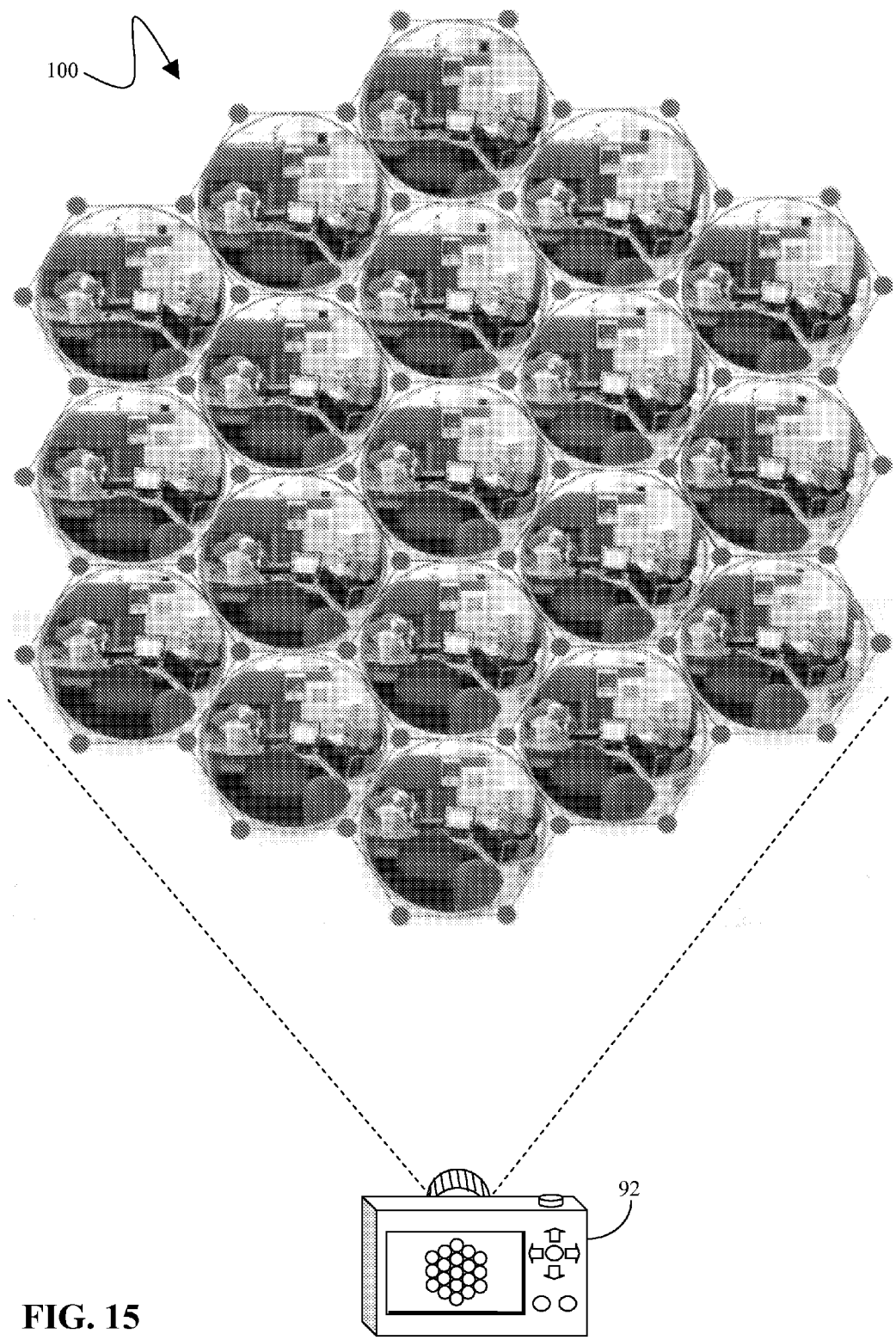
FIG. 15 shows a catadioptric camera in accord with the present invention.

With reference to FIG. 15, an example of a real-world catadioptric camera system in accord with the present invention may include a plurality of curved mirrors arranged into a mirror array 100 (for example, a hexangular beehive-shaped array) and at least one camera 92 (preferably a pinhole camera). In the present example, each mirror in mirror array 100 has a substantially circular circumference and a warped (i.e.

parabolic or otherwise curved) surface, and camera 92 is configured such that it images (i.e. photographs or image-captures) reflected images of all (or a plurality of) the mirrors in mirror array 100 simultaneously.

Alternatively, camera 92 may be configured to image a subset of mirror array 100 at a time, or a separate camera may be provided per mirror. Further alternatively, multiple cameras may be used in a setup where each of the multiple cameras separately images a subset of mirror array 100. In these cases, it is desirable that the captured image of each camera have some overlap with the captured image of another (and preferably adjacent) camera. Before continuing, it may be beneficial to discuss the vertical parallax characteristic to catadioptric camera systems.

Figure 16:
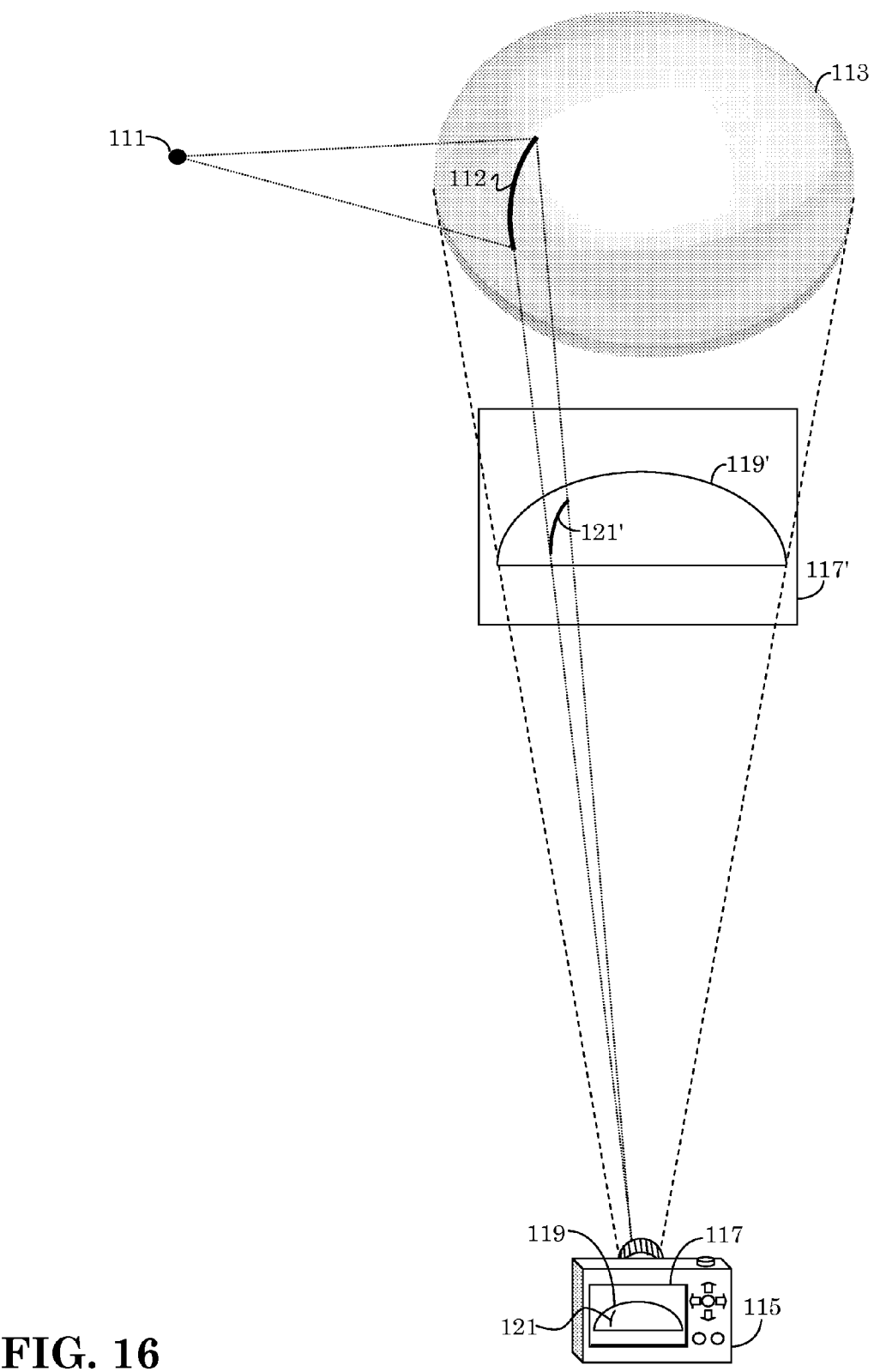
FIG. 16 illustrates a vertical distortion of a point in a catadioptric camera setup as the basis for an epsilon line.

A real-world example of vertical distortion in a catadioptric camera is illustrated in FIG. 16, where a point 111 in a 3D scene is shown to undergo an elongating distortion by a curved (i.e. dome) mirror 113 to form (i.e. reflect) a vertical curve line 112 relative to the viewing position of a camera 115. Camera 115 forms a 2D image 117 of a 2D representation 119 of 3D curved mirror 113. Curved line 112, which may follow the curvature of curved mirror 113, forms a distorted vertical curved line 121 in image 117. For ease of illustration, an enlarged image plane 117' of image 117 is shown. Within enlarged image plane 117', vertical curve line 121' is shown within the 2D representation 119' of 3D curved mirror 113.

It is to be understood that the elongating and the length of curved line 112 is exaggerated in FIG. 16 for ease of explanation. Also in the present example, real-word point 111 is shown forming a relatively vertical reflection (i.e. curve line 112), but it is to be understood that, depending upon the orientation of mirror 113 relative to point 111 and to the view angle of camera 115, point 111 may form a diagonally distorted (i.e., a combined horizontally and vertically distorted) reflection on mirror 113. This elongation distortion of a point by a curved mirror is herein termed an epsilon line.

The epsilon line forms the basis of what is herein termed an epsilon stereo constraint. That is, if one can determine the size, position, and orientation of an epsilon line corresponding to a real point in a 3D scene, then one can determine if a 3D point within a 3D scene corresponds to a specific feature point in a first (distorted 2D) image taken at a first view angle by determining if the 3D point maps to the determined epsilon line (i.e. if it lies on or within a predefined distance from the determined epsilon line). Furthermore, if one can do the same for a second distorted 2D image taken from a second view angle, and the camera used to take both 2D images is calibrated to the curved mirror(s), then one can determine if both feature points on both 2D images correspond to each other.

Figure 17:
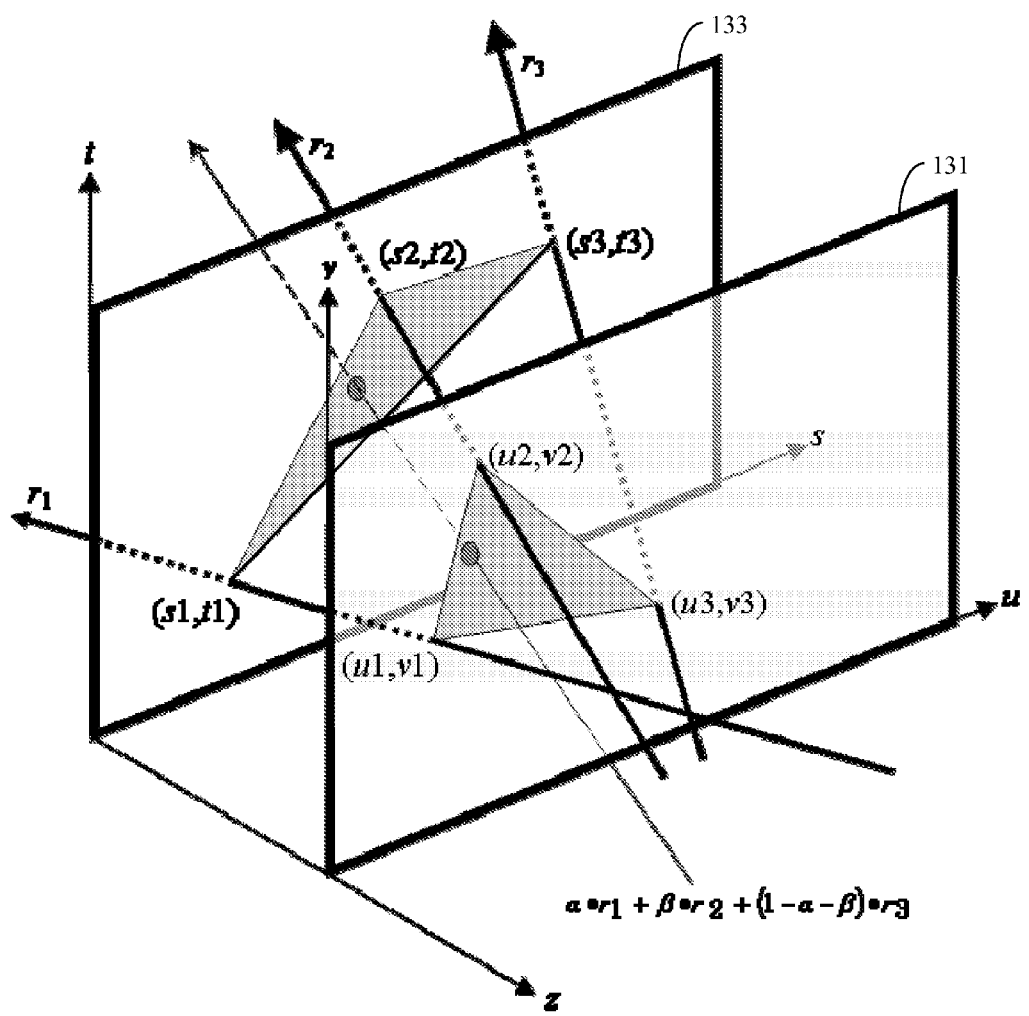
FIG. 17 provides a general description of the General Linear Camera (GLC) framework.

In order to provide a general explanation for determination of epsilon lines, and the subsequent epsilon constraint, it is beneficial to first provide a general camera model within which to derive the epsilon constraint. For ease of illustration, the present derivation is made within the framework known in the art as the General Linear Camera (GLC) model, which provides a general framework applicable to many types of cameras, including multi-perspective cameras such as catadioptric cameras. A general description of the GLC framework is illustrated in FIG. 17.

In the GLC framework, radiance along all possible affine combinations of three light rays (hereinafter rays) are collected. The rays are parameterized by their intersections of two parallel planes. In FIG. 17, rays $r_1$, $r_2$, and $r_3$ are parameterized by their intersections with parallel planes 131 and 133. Each of the two parallel planes is a Cartesian plane described by its own abscissa and ordinate coordinates. For the sake of consistency with the above discussion on light fields, plane 131 may be described by Cartesian coordinates [u,v] and plane 133 may be described by Cartesian coordinate [s,t]. This parameterization may be called a two-plane parameterization. Preferably, each ray is re-parameterized by substituting σ=s−u and z=t−v. For ease of explanation, [σ,τ,u,v] parameterization is used herein.

It is assumed plane 131 (hereinafter plane uv) is the default plane, and it is at position z=0 (i.e. z direction perpendicular to plane uv), and plane 133 (hereinafter plane st) is at z=1. Thus [σ,τ,1] represents the direction of a ray.

A GLC is defined as the affine combination of three rays:

$$\text{GLC}=\{r:r=\alpha\cdot[\sigma_1,\tau_1,u_1,v_1]+\beta\cdot[\sigma_2,\tau_2,u_2,v_2]+(1-\alpha-\beta)\cdot[\sigma_3,\tau_3,u_3,v_3],\forall\alpha,\beta\} \quad (1)$$

The GLC model is now simplified by choosing three specific rays that have [u,v] coordinates as [0,0], [1,0], and [0,1] to form a canonical GLC:

$$r[\sigma,\tau,u,v]=(1-\alpha-\beta)\cdot[\sigma_1,\tau_1,0,0]+\alpha\cdot[\sigma_2,\tau_2,1,0]+\beta\cdot[\sigma_3,\tau_3,0,1] \quad (2)$$

Figure 18:
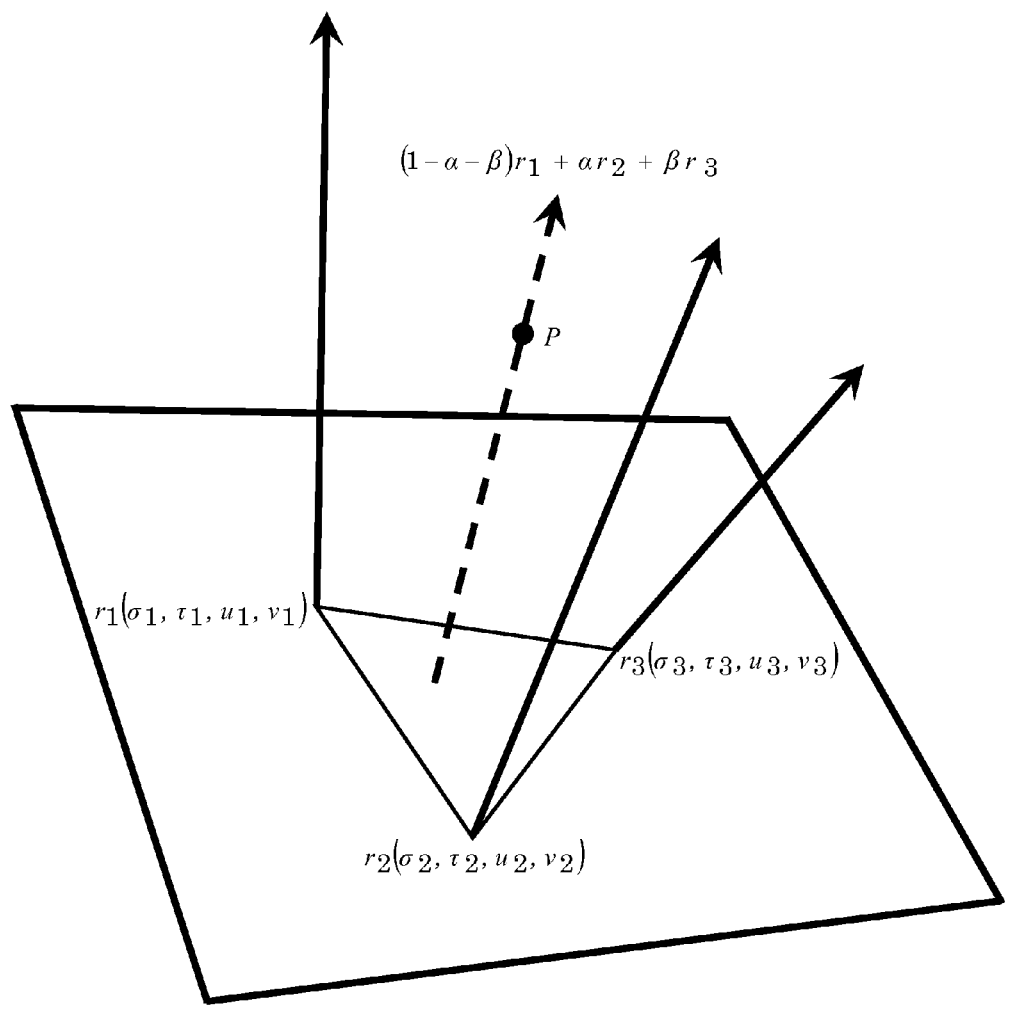
FIG. 18 illustrates the mapping of a 3D point P[x,y,z] to pixel [u,v] by GLC projection.

From the above, it is self-apparent that α=u and β=v. Therefore, every pixel [u,v] maps to a unique ray in the GLC. As is illustrated in FIG. 18, the GLC projection maps a 3D point P[x,y,z] to a pixel [u,v], where:

$$u = \frac{\begin{vmatrix} z\sigma_1 & z\tau_1 & 1 \\ x & y & 1 \\ z\sigma_3 & 1-z\tau_3 & 1 \end{vmatrix}}{Az^2+Bz+C}, \quad v = \frac{\begin{vmatrix} z\sigma_1 & z\tau_1 & 1 \\ 1+z\sigma_2 & z\tau_2 & 1 \\ x & y & 1 \end{vmatrix}}{Az^2+Bz+C} \quad (3)$$

Basically, GLC projection maps every 3D point P to a ray. It is to be understood that the illustrated triangle and rays $r_1$, $r_2$ and $r_3$ provide reference frame for defining the ray to which point P maps, but do not themselves have a physical representation. The GLC model unifies many previous cameras, including the pinhole camera, the orthographic camera, the pushbroom camera, and the cross-slit camera.

The denominator corresponds to the characteristic equation of the GLC:

$$Az^2+Bz+C=0 \quad (4)$$

$$A=\begin{vmatrix} \sigma_1 & \tau_1 & 1 \\ \sigma_2 & \tau_2 & 1 \\ \sigma_3 & \tau_3 & 1 \end{vmatrix}, B=\begin{vmatrix} \sigma_1 & v_1 & 1 \\ \sigma_2 & v2 & 1 \\ \sigma_2 & v_3 & 1 \end{vmatrix}-\begin{vmatrix} \tau_1 & u_1 & 1 \\ \tau 2 & u2 & 1 \\ \tau_3 & u_3 & 1 \end{vmatrix}, C=\begin{vmatrix} u_1 & v_1 & 1 \\ u2 & v2 & 1 \\ u_3 & v_3 & 1 \end{vmatrix} \quad (5)$$

The root $z_i$ (i=1, 2) in equation (4) corresponds to a slit (line) on plane z=$z_i$ that all rays in the GLC will simultaneously pass through. For instance, the cross-slit characteristic equation has two distinct roots since all rays simultaneously pass through two slits whereas an oblique camera has no solution.

Having described the GLC framework, the next step is to provide a more rigorous explanation of the epsilon constraint, or alternatively, epsilon stereo pairs. In epipolar geometry, a stereo pair consists of two images with a purely horizontal parallax, i.e., for every 3D point P, its images [u,v] and [u',v'] in two camera views from two distinct FOV's must satisfy v=v'. The present epsilon stereo model, i.e. epsilon stereo pairs, effectively fuses camera pairs that do not satisfy the stereo constraint of epipolar geometry.

Figure 19:
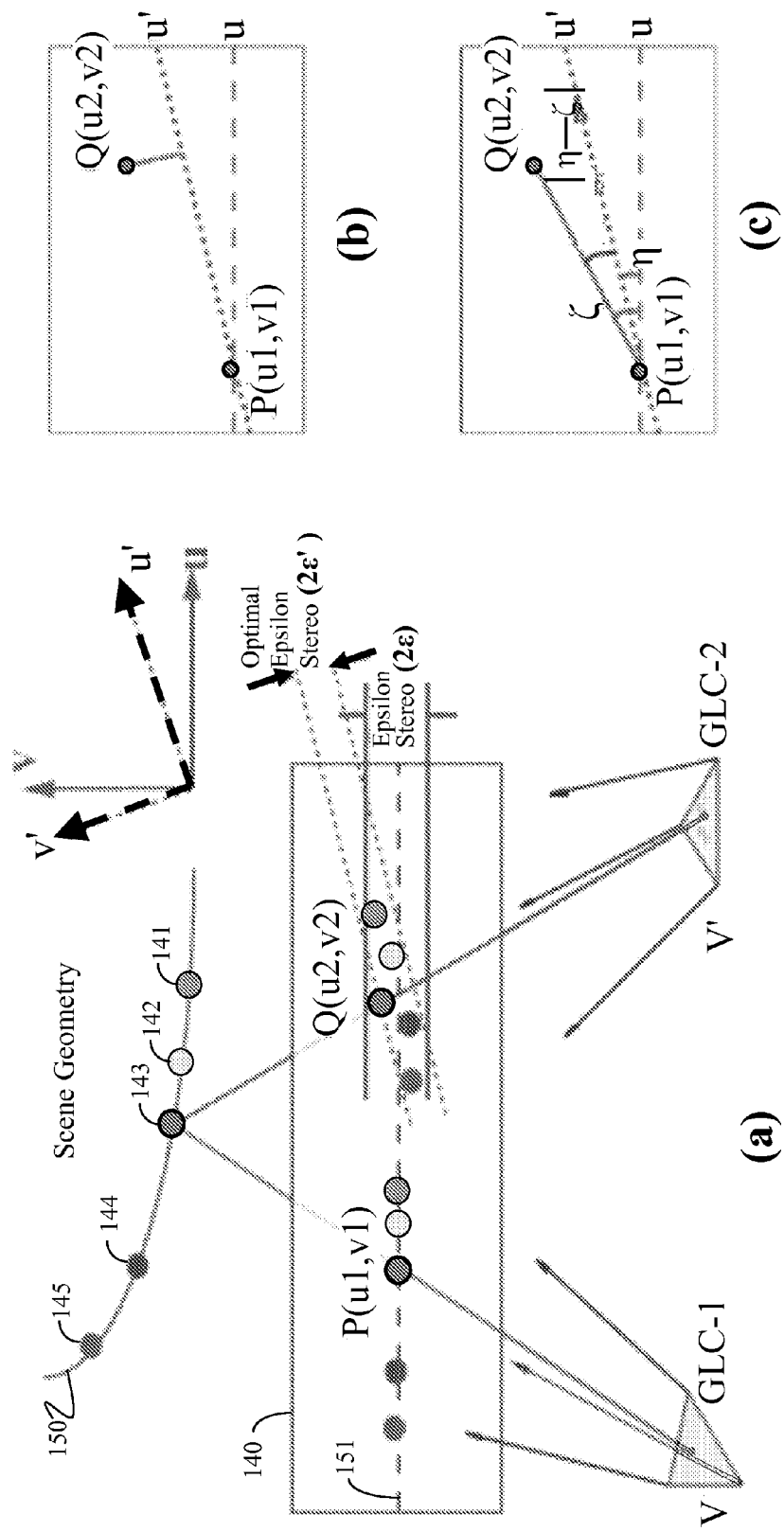
FIG. 19 illustrates the basis of the epsilon stereo model.

With reference to FIG. 19, in image (a), five points 141-145 on a real-world object 150 undergo distortion when viewed from two distinct view points, V and V'. In the present example, real-world object 150 may be a curved reflective surface, such as curved mirror 113 of FIG. 16. Due to the distortion, points 141-145, which follow the curvature of object 150, appear to follow a straight, horizontal line 151 from the viewpoint of view V. But from the viewpoint of view V', points 141-145 appear to follow a sequential wavy pattern along an upward path diagonal to horizontal line 151.

Each of points 141-145 is distorted, and each defines a distortion offset or vertical parallax (such as suggested by vertical curve line 112 in FIG. 16, described above). This vertical parallax is herein termed an epsilon, $\epsilon$, vertical parallax. From the viewpoint of view V', point 143 may be seen anywhere within a distortion offset of $2\epsilon$. Thus, if point Q is determined to reside within the distortion offset of point 143, then point Q may correspond to point 143. But if point Q is determined to reside outside the distortion offset defined by point 143, then it may be concluded that point Q does not correspond to point 143.

Thus, two views V and V' form an epsilon stereo pair (i.e. a feature point in view V corresponds to a feature point in view V') if the following property holds:

rays $V(u,v)$ and $V'(u',v')$ intersect only if $|v-v'| \leq \epsilon$.

Basically, an epsilon stereo pair consists of two images, which may have a mostly horizontal parallax, having a slight $\epsilon$ vertical parallax. The $\epsilon$ vertical parallax may be measured using a distance metric, as illustrated in image (b), or an angular metric, as illustrate in image (c). If desired, the horizontal direction $\vec{d}$ may be changed (i.e. the reference axis may be shifted and/or rotated) to reduce $\epsilon$, as illustrated as the "optimal epsilon stereo" in image (a). An example of this is in an environment with two curved mirrors is illustrated in FIGS. 20A and 20B.

Figure 20A:
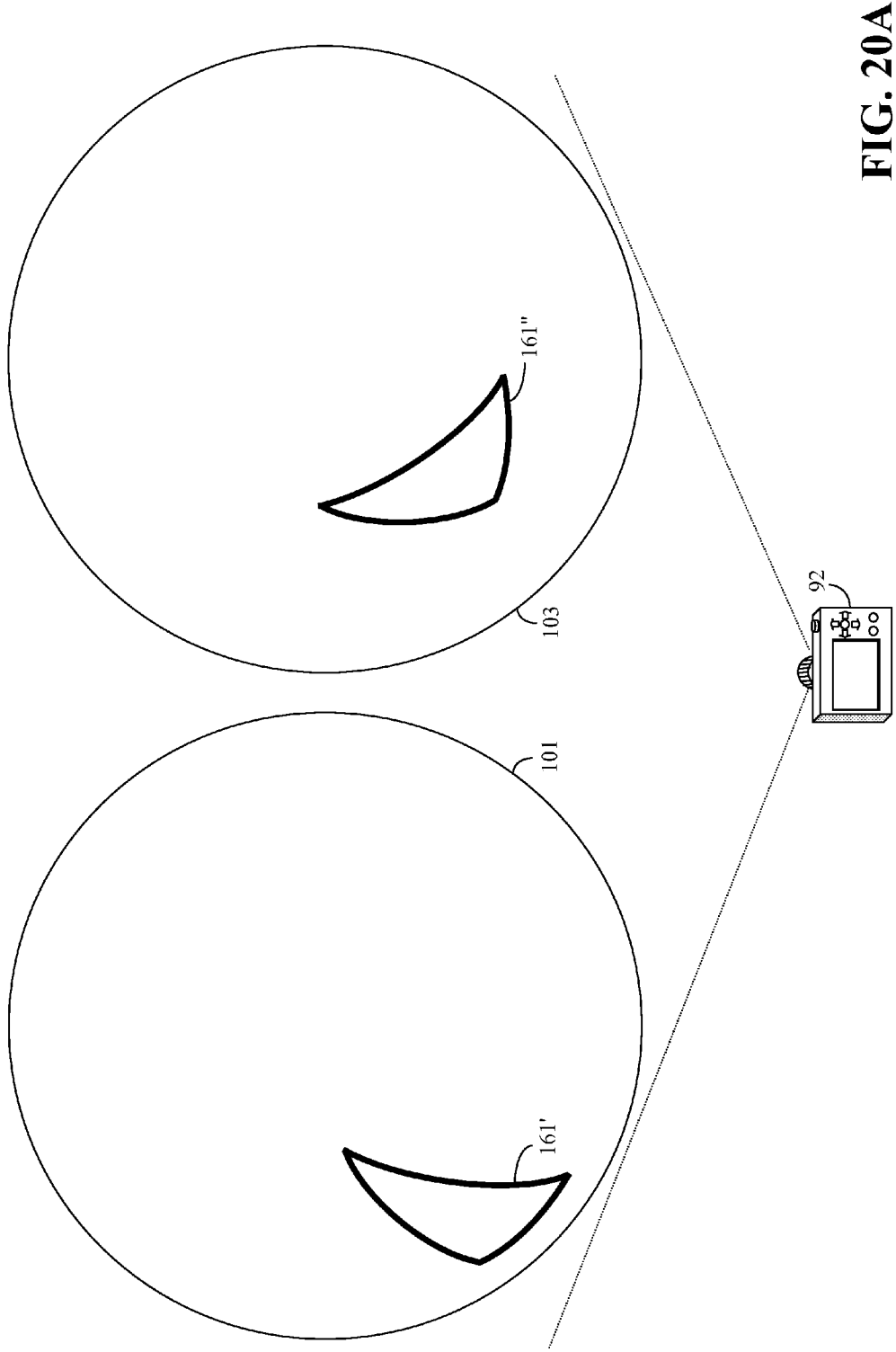
FIGS. 20A and 20B illustrate the use of the epsilon stereo constraint in an catadioptric camera.

With reference to FIG. 20A, curved mirrors 101 and 103 are representative of any two mirrors in mirror array 100 of FIG. 15. It is to be understood that the present example may be directly extended to three or more mirrors. For ease of explanation, the images on mirrors 101 and 103 are each illustrated as showing a distorted right triangle. Mirror 101 shows a first distorted (i.e. curved) view 161' from a first FOV of the right triangle from a real 3D scene (not shown), and mirror 103 shows a second distorted view 161" of the same right triangle from a second FOV. Camera 92 captures an image of both mirrors 101 and 103.

Figure 20B:
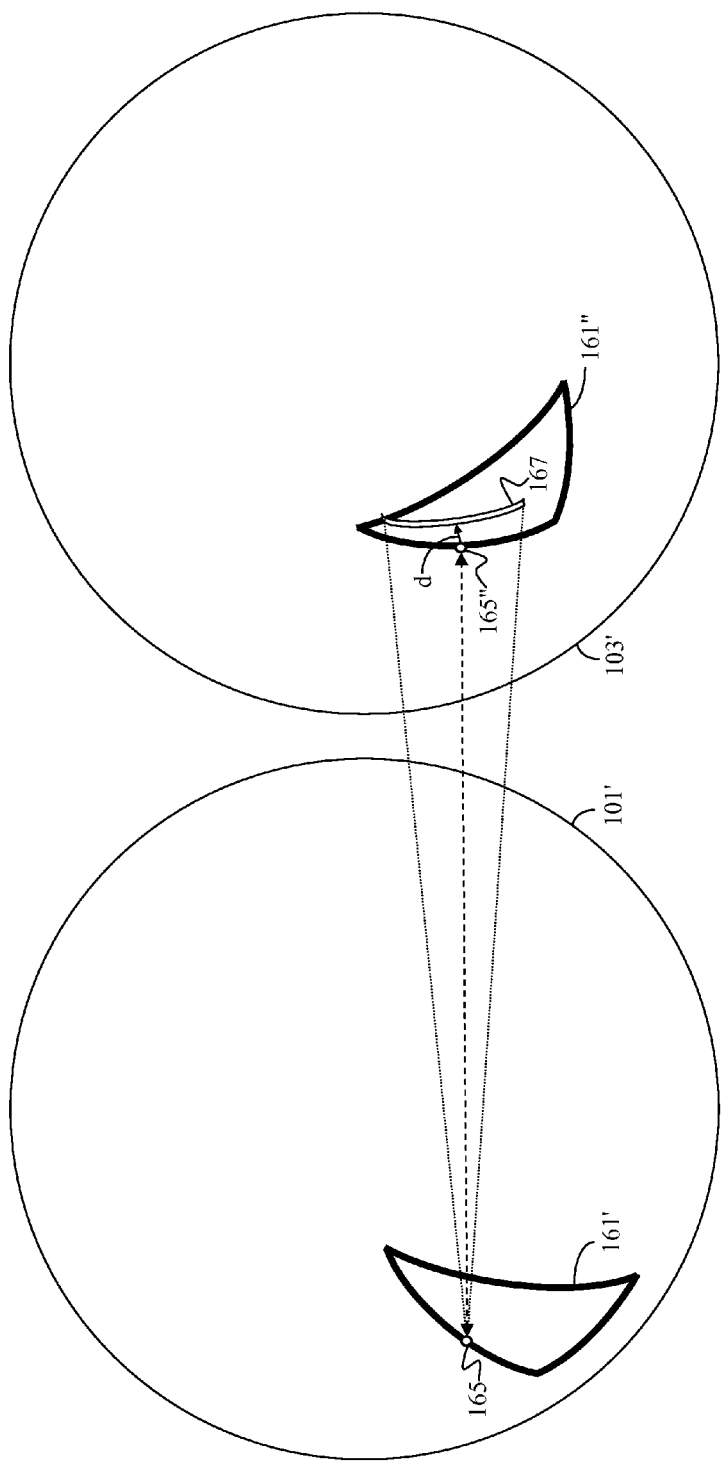

The resultant multi-perspective images are shown in FIG. 20B. Image 101' corresponds to the image taken of mirror 101, and image 103' corresponds to the image taken of mirror 103. For illustration purposes, an edge pixel 165 (i.e. a point on mirror image 101') of triangle 161' and its corresponding epsilon stereo constraint curve 167 on the mirror image 103' are shown. If one wanted to verify that a point (or pixel) 165" on mirror image 103' matches (i.e. "corresponds to", or "registers to") point 165 of mirror image 101', one would need to determine if the potential point 165" meets the epsilon constraint.

As an example, if it is desirable to know if point 165" in mirror image 103' may be indexed to (i.e. corresponds to, or matches) point 165 in mirror image 101', then one would determine if pixel point 165" is substantially within the epsilon stereo constraint of pixel point 165. Potential point 165" may have been identified by epipolar-based techniques, or other known techniques for identifying feature points of interest. To determine if potential point 165" indeed corresponds to point 165, the shortest distance d from potential pixel point 165" to the identified epsilon stereo constraint curve 167 is ascertained. If this distance d is not greater than a predefined maximum, Dmax, (preferably 5 pixels), then potential corresponding point 165" is deemed to truly correspond to pixel point 165 (i.e. pixel(s) 165" is (are) indexed to pixel(s) 165).

If desired, an index of match pixel pairs (or matched ray-xel pairs, as explained below) may be maintained, in which case, the pixel pair comprised of pixel point 165 and potential corresponding pixel point 165" would be added to an index of matched pixel pairs (or matched ray-xel pairs). Alternatively, if the determined distance d is greater than the predefined maximum Dmax, then the potential corresponding point 165" could be rejected as not corresponding to point 165. In this case, the pixel(s) 165 and the potential corresponding pixel(s) 165" would be removed from (or otherwise omitted from) the index of matched pixel pairs.

Any two such views may be referred to as an e-pair. Preferably, it may be assumed that all views are u-continuous and v-continuous. Scene analysis may be simplified by considering only scene geometry visible from both views. A more detailed discussion of epsilon stereo pairs may be found in "Epsilon Stereo Pairs", British Machine Vision Conference (BMVC), 2007, by Yuanyuan Ding (an inventor of the present invention), et al., herein incorporated in its entirety by reference.

Returning to the present invention, as it would be understood by one versed in the art, a catadioptric setup such as that of FIG. 15 would undergo an initial system calibration process. There are various calibration methods known in the art, and an example of a typical calibration process is as shown in reference to FIG. 10A. An important distinction of the present invention, however, is that the vertical parallax created by the curved mirrors is not ignored, as is explained more fully below.

Figure 21:
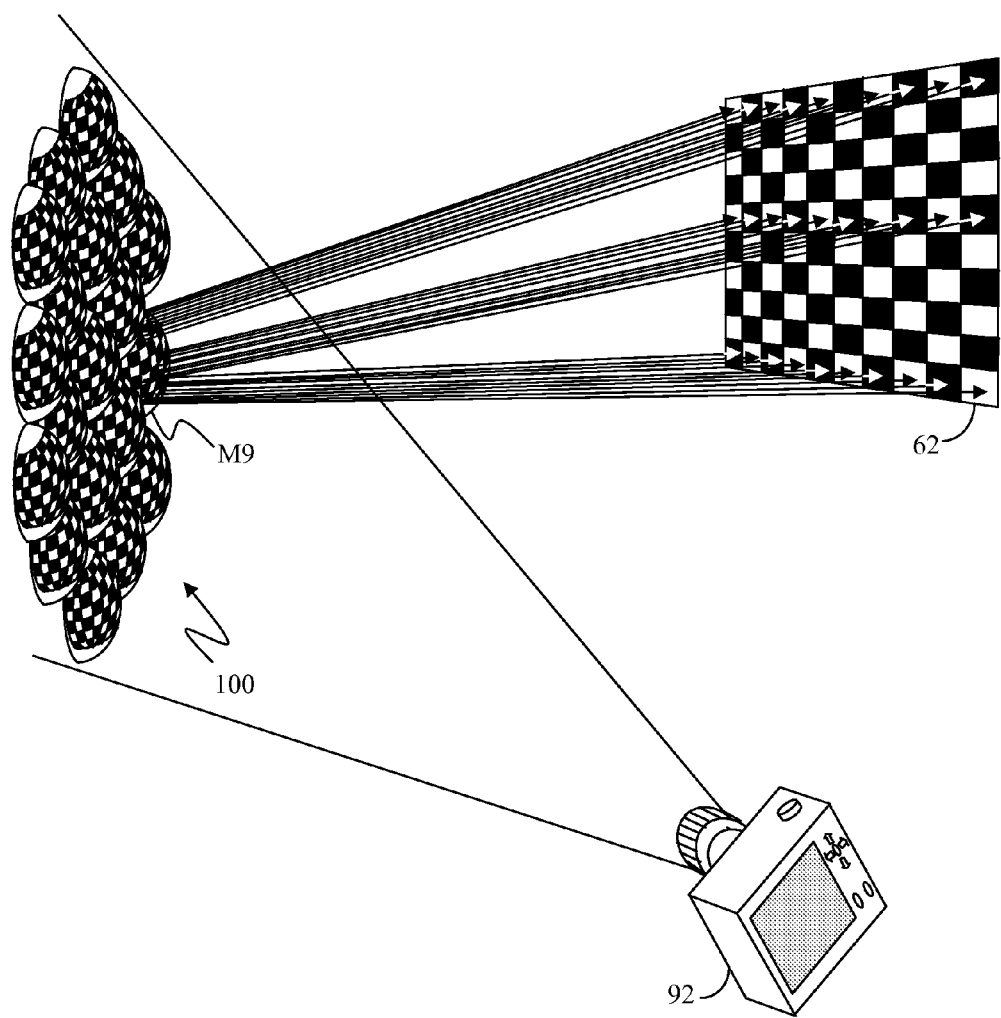
FIG. 21 illustrates one part of a catadioptric calibration process in accord with the present invention.

With reference to FIG. 21, where all elements similar to those of FIG. 15 have similar reference characters and are described above, a preferred calibration process would place a predefined, reference item (such as a checkered board 62) to simulate a 3D scene in front of mirror array 100. A digital camera 92 would then capture an image (or images) of the reflected checkered board from each mirror in mirror array 100. A distinction of the present calibration method from those of the prior art, however, is that the exact positions of checkered board 62, mirror array 100 and camera 92 relative to each other are determined, and the present calibration method further calibrates and makes note of the light ray direction from every surface point on each mirror (i.e. every point that corresponds to an imaged pixel) to its corresponding point on the 3D scene.

In the presently preferred embodiment, the each pixel of the image captured by camera 92 is correlated to its corresponding mirror. The surface curvature of each mirror is determined so that each surface location (i.e. surface point) on each mirror is mapped to its corresponding image pixel, and each surface point is also mapped to its corresponding, specific physical point on checkered board 62. This mapping information may be stored in an electronic memory, which may be incorporated within camera 92 or be accessible by camera 92 or be otherwise combined with camera 92 (such as by means of a data processing device external to camera 92).

For ease of illustration three rows of black and white squares are shown vector-mapped to their reflected positions on the surface of mirror M9. In the present case, this vector-mapping means the determining and storing of the direction of the light rays from each point (that corresponds to an image pixel) on mirror M9 to its corresponding point on checkered board 62, as illustrated by arrows leading from points on mirror M9 to corresponding physical points on checkered board 62. It is to be understood that all surface points (that corresponds to an image pixel) on mirror M9 are vector-mapped to their respective physical point in the 3D scene. It is further to be understood that all mirrors in mirror array 100 are similarly vector-mapped. That is, each surface location on each mirror corresponding to a pixel in the captured image would be similarly vector-mapped. In this manner, it is possible to determine the direction of a light ray coming from a 3D scene (represented by checkered board 62) to each individual mirror, and determine the physical surface position on the individual mirror where the received light ray bounces off. This vector-mapping information may likewise be stored in an electronic memory, which may be incorporated within camera 92 or be accessible by camera 92 or be otherwise combined with camera 92.

Figure 22:
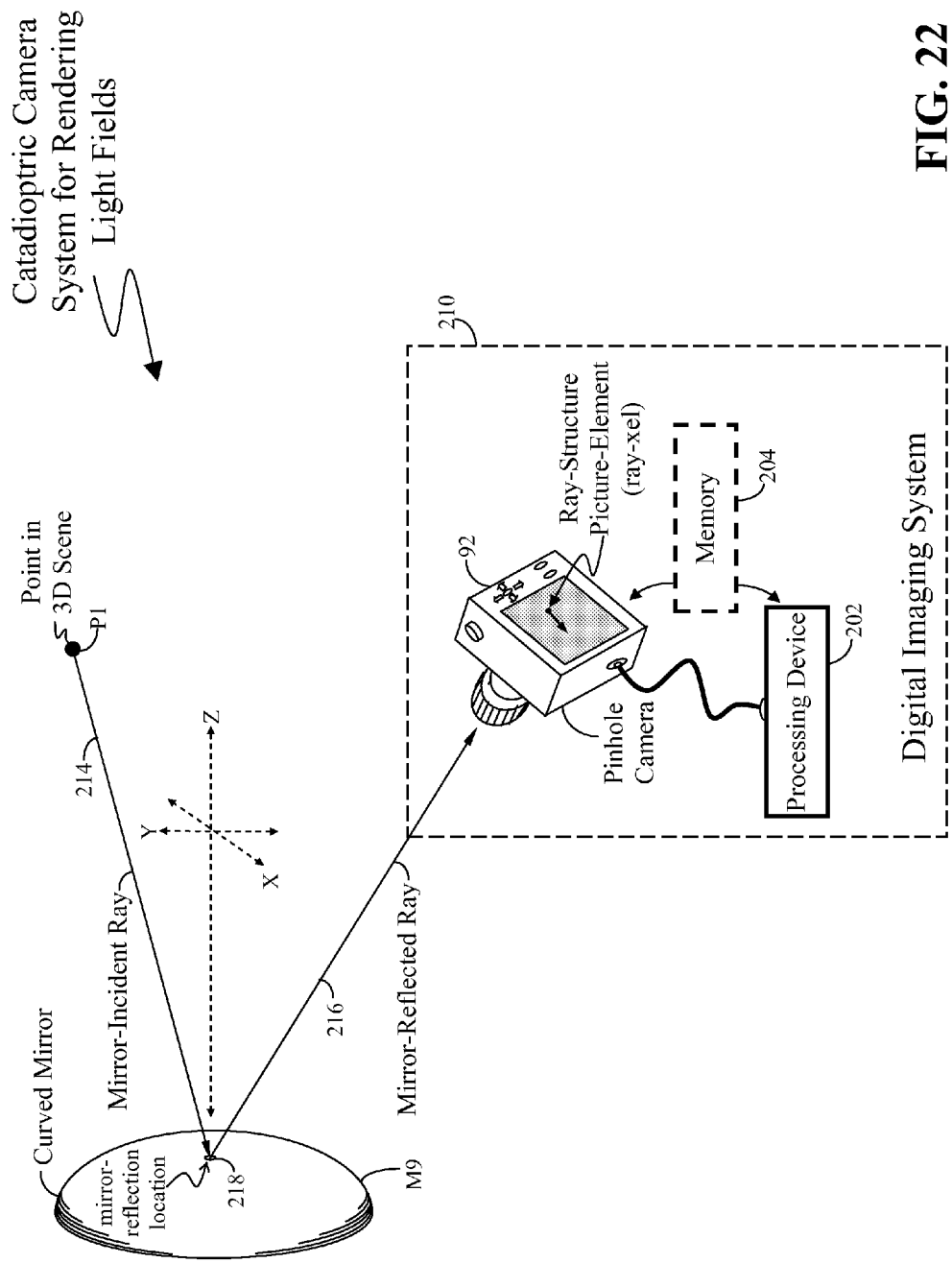
FIG. 22 illustrates a simplified setup of a catadioptric camera in accord with the present invention.

A simplified catadioptric system in accord with the present invention, after calibration, is illustrated in FIG. 22, where all elements similar to those of FIGS. 15 and 21 have similar reference characters and are described above. For ease of explanation only one mirror M9 is illustrated in FIG. 22, but it is to be understood that mirror M9 would be one of a plurality of mirrors comprising mirror array 100.

As shown, a 3D scene (represented by a single point P1) is reflected off mirror array 100 (represented by single, exemplary mirror M9). For ease of explanation, a single mirror-incident ray 214 is shown traveling from point P1 to mirror M9. As is explained above, the vector direction of mirror-incident ray 214 relative to the reflection point on the surface of mirror M9 (identified as mirror-reflection location 218) may be recorded using a Cartesian coordinate system, illustrated by XYZ axis lines. This defines mirror-incident ray direction coordinates that are indicative of a vector direction of mirror-incident ray 214 from point P1 to mirror-reflection location 218.

As it would be understood, mirror-incident ray 214 reflects (i.e. bounces) off mirror-reflection location 218 and becomes mirror-reflected ray 216 traveling to a digital imaging system 210. The coordinates of mirror-reflection location 218 may be recorded as mirror-reflection location coordinates using the (or similar) Cartesian coordinate system, or other appropriate coordinate system. mirror-reflected ray 216 is then captured by digital image system 210 and stored as a part of a ray image, as explained more fully below.

Digital imaging system 210 captures ray images of mirror array 100 (of which only mirror M9 is shown). Digital imaging system 210 may be constituted by pinhole camera 92 alone, or may be comprised of pinhole camera 92 in combination with a digital processing device 202. The captured ray images, and or calibration data, may be stored within camera 92 or may alternatively be stored in an optional external electronic memory 204. Electronic memory 204 may optionally reside within camera 92 or within digital processing device 202, or be accessible by camera 92 and/or digital processing unit 202.

Each ray image is a two-dimensional array of ray-structure picture-elements (ray-xels), and each respective ray-xel includes a light intensity measure according to a predefined color model, mirror-reflection location coordinates, and mirror-incident ray direction coordinates. The light intensity measure is indicative of the light intensity received at a respective ray-xel. In the present illustration, the ray-xel corresponding to mirror-reflected ray 216 is illustrated as a point with an array leading away from the point. The point indicates the light intensity measure and mirror-reflection location coordinates, and the array indicates the mirror-incident ray direction.

Figure 23:
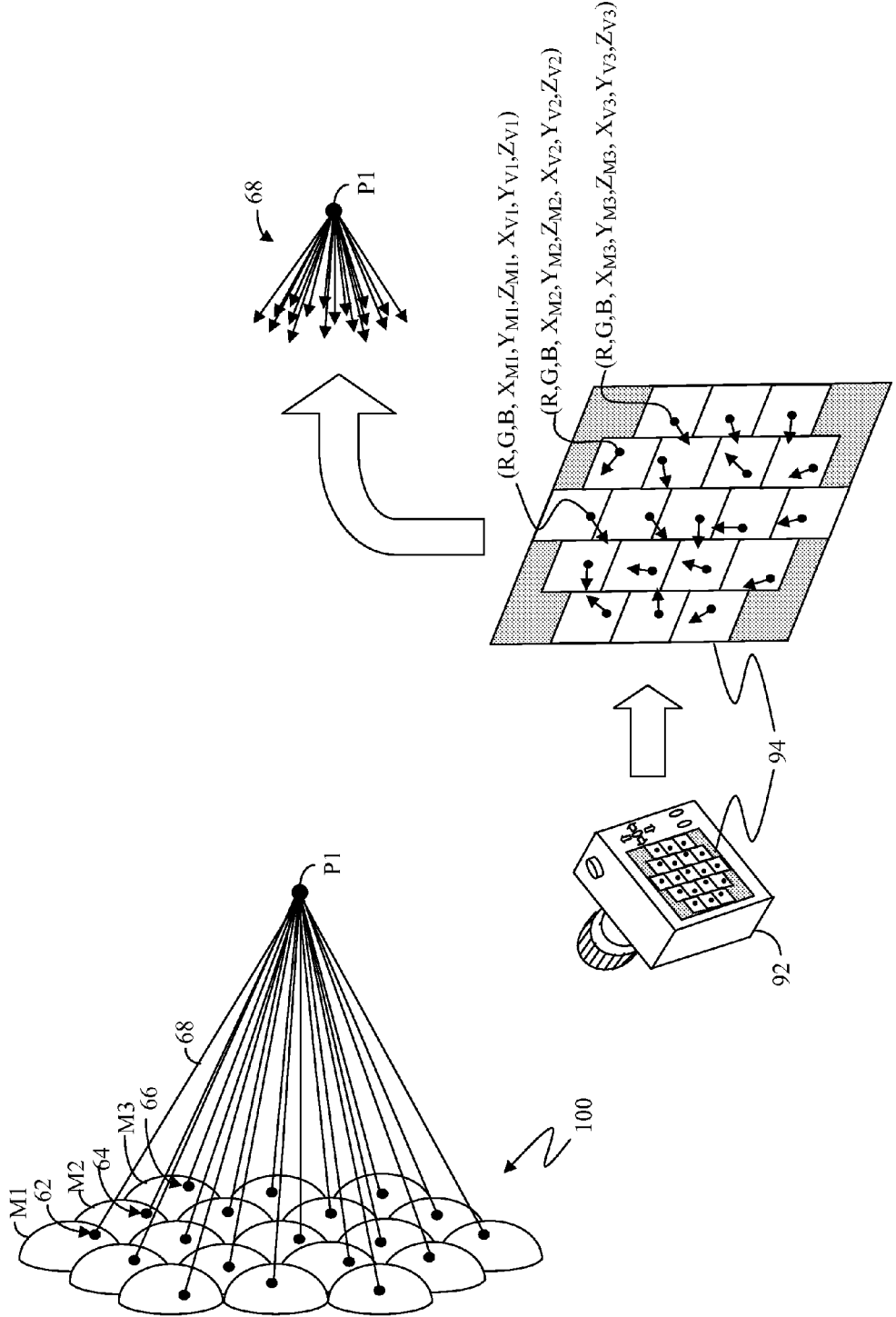
FIG. 23 illustrates the use of a catadioptric camera in accord with the present invention in the capturing of a light field.

A more complete illustration of the use of the present embodiment in the creation of a light field is provided in FIG. 23, where all elements similar to those of FIGS. 15 and 21-22 have similar reference characters and are described above. For the sake of simplicity, mirror array 100 is again illustrated in front of a single physical point P1 in a physical 3D scene, which in the present example corresponds to a single pixel in each captured image of each mirror. It is to be understood that a typical 3D scene would be comprised of larger objects. Preferably, the mirrors are not limited to spherical mirrors, but rather may have any curvature including being concave or convex, with various degrees of curvature.

Camera 92 captures a ray image 94 of mirror array 100. For illustration purposes, ray image 94 is shown partitioned into sectors, one per mirror, in order to emphasize the correlation between image pixels and their corresponding mirror. It is to be understood that this may be achieved by appropriate mapping of the pixels. This mapping of pixels may be part of the calibration process.

There are several standard color models for defining a digital image, but digital cameras most commonly record captured image in the Red-Green-Blue (RGB) color model. That is, each pixel of a captured image records an RGB value indicative of its captured (color) light intensities. The present invention, however, modifies how digital images are recorded by incorporating directional (or vector) information in addition to light intensity (which includes color) information for each pixel. Irrespective of the color model used to record a digital image, the presently preferred embodiment further stores additional location and light ray direction information.

Preferably, the surface of each mirror is determined according to a predefined coordinate system (i.e. a surface mapping system) so that the physical position of each mirror-reflection location on each mirror is recorded. Preferably, each mirror-reflection location (i.e. surface position) on each mirror is recorded with Cartesian coordinates such as $(X_{M0}, Y_{M0}, Z_{M0})$, or other suitable coordinate system, where $(X, Y, Z)$ identify the surface coordinates and M0 identifies a given mirror. If desired, a parameter $P_0$ may be added to identify the physical point in the 3D scene that is being reflected (this may be used in point registration, if desired). In this case, each physical surface location may be recorded as $(X_{M0}P_0, Y_{M0}P_0, Z_{M0}P_0)$, where $P_0$ identifies a specific point in the 3D scene. A mapping of each mirror-reflection location and corresponding physical point may be achieved during a calibration process. Alternatively, or in addition, the correlation of physical points among the plurality of mirrors may be made after storing the captured ray image by combining epsilon stereo constraints and epipolar stereo constraints.

For example in FIG. 23, physical point P1 is reflected on mirror M1 at mirror-reflection location 62, which may be mapped as $(X_{M1}, Y_{M1}, Z_{M1})$. If the physical point being reflected is also recorded, then the mirror-reflection location that reflects point P1 may be recorded as $(X_{M1}P_1, Y_{M1}P_1, Z_{M1}P_1)$. The same physical point P1 is reflected on mirror M2 at mirror-reflection location 64, which may be mapped as $(X_{M2}, Y_{M2}, Z_{M2})$. Again if physical point being reflected is also mapped, then the mirror-reflection location on mirror M2 that reflects point P1 may be recorded as $(X_{M2}P_1, Y_{M2}P_1, Z_{M2}P_1)$. As a third example, physical point P1 is reflected on mirror M3 at mirror-reflection location 66, which may be mapped as ($X_{M3},Y_{M3},Z_{M3}$). As before, if physical point $P_1$ is also mapped at the time of ray image capture, then the mirror-reflection location on mirror M3 that reflects point P1 may be recorded as ($X_{M3}P_1, Y_{M3}P_1, Z_{M3}P_1$).

In addition to storing the physical, mirror-reflection location of each mirror where a point is reflected, the present invention further preferably stores mirror-incident ray direction information leading from the mirror-reflection location on each mirror to the physical point in the 3D scene that is being reflected. For each of discussion, this ray direction is herein termed a vector, or vector direction. It is to be understood that a vector would typically include both magnitude and direction, but the RGB values may be used as the magnitude component of a light ray vector, if desired. As is explained above, one method of obtaining the mirror-incident ray direction is at the time of system calibration by placing a known and mapped pattern as the 3D scene, and noting the reflection location and direction of each known pattern location on each mirror. Since the surface of each mirror is mapped, and the location of each mapped pattern is known, the light ray direction from each mirror surface location to each pattern location can be determined and stored.

This vector direction is stored (preferably at the time of ray image capture) using Cartesian coordinates (or other suitable coordinate system), and may be indicated as dx,dy,dz. For example in mirror M1, the direction of mirror-incident ray 68 from mirror-reflection location 62 ($X_{M1},Y_{M1},Z_{M1}$) to physical point P1 may be stored as ($dx_1,dy_1,dz_1$). Similarly, for mirror M2, mirror-incident ray from mirror-reflection location 64 ($X_{M2},Y_{M2},Z_{M2}$) to physical point P1 may be stored as ($dx_2,dy_2,dz_2$).

Therefore each ray-xel of a captured ray image stores not only color/light strength values according to any given color model, but also stores the physical, surface reflection location on each mirror for a given pixel (indicated as mirror-reflection location at $X_{M0},Y_{M0},Z_{M0}$) and a vector direction for a light ray from this physical location to the actual physical point in the 3D scene (indicated as mirror-incident ray direction $dx_0$, $dy_0,dz_0$). The resultant picture element recording structure is thus termed a ray structure.

For generality and computational efficiency, the resultant multi-perspective ray image is modeled using a "2D image of 2D rays". More precisely, a ray image is a 2D array of "ray structures". As opposed to classical images that only store "RGB" values for each pixel, a "ray-xel" (in accord with the present invention) stores not only "RGB" information but also stores the ray initial mirror-surface location (mirror-reflection location at $X_{M0},Y_{M0},Z_{M0}$) and ray direction (mirror incident ray direction $dx_0,dy_0,dz_0$). Ray structures incorporating vector direction information are illustrated as arrows in capture image 94. For ease of illustration, stored RGB, mirror-reflection location, and mirror-incident ray direction information for pixels in mirrors M1, M2, and M3 are likewise shown.

When one puts together the ray-xel information from each mirror corresponding to a common point, P1, the result is a light field 68 corresponding to the common point P1. Basically, each ray image of each mirror contributes its own separate (and individual) light intensity information and/or mirror-reflection location and/or mirror-incident ray direction information.

The ray-xels that correspond to each other may be identified by according to their mirror-reflection location and/or mirror-incident ray direction information. That is, each surface location on each mirror is mapped to a separate point on the 3D, and this mapping may be used to determine the ray-xels in each ray image that correspond to each other. Alternatively, the correspondence between ray-xels may be determined according an index of matched ray-xel pairs.

Thus, an advantage of "ray image" modeling is that it permits the direct rendering light field from each captured image without complicated modeling. The present approach also has no requirement on the shape types of mirror surfaces or camera-mirror alignment.

Additionally, as is explained above with reference to FIG. 17-19, the definition or three rays $r_1$, $r_2$, and $r_3$ in the GLC is purely to create a reference from which to define a projected point. However, since in the present case, rays $r_1$, $r_2$, and $r_3$ would constitute triangles on each reflected image on each mirror, this effectively defines triangle-rendition of each mirror image. As it is known, GPUs work on the premise that all everything is made of triangles, and they first carve up any more complex shapes, such as quadrilaterals or curved surface patches, into triangles (i.e. triangle rendering). Since the present ray images are already defined by triangle rendering, the presently captured ray images permit direct GPU based texture mapping from multi-perspective catadioptric cameras to arbitrary desired perspective views in a rendering step.

Figure 24:
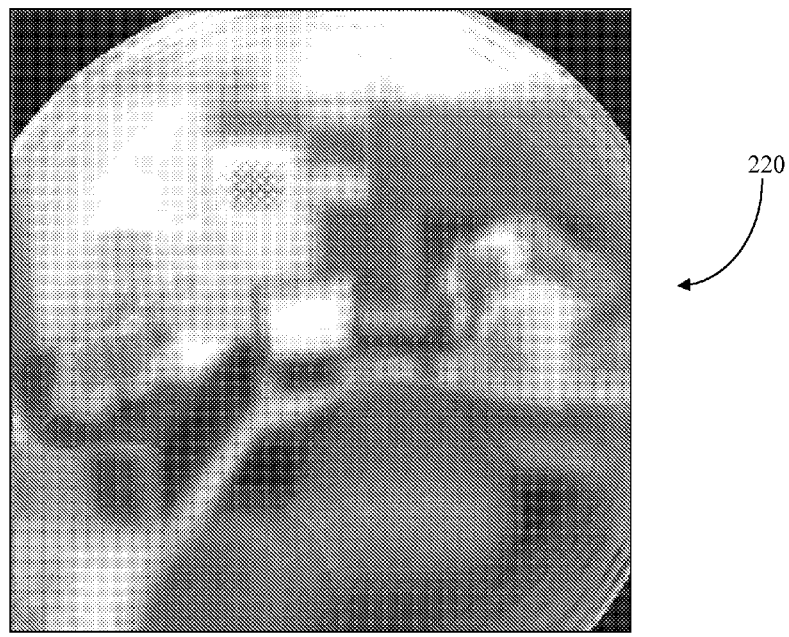
FIG. 24 illustrates a captured light field image in accord with present invention.

An example of creating a light field image 220 by combining the ray-xel information from each mirror of mirror array 100 of FIG. 15 is illustrated in FIG. 24. As it would be understood, one could use light field image 220 to individually bring into focus any select item within the light field. Additionally, because of the big variation in the field-of-vision provided the different mirror in mirror array 100, light field image 220 is effectively a synthetic big aperture image. This may permit compensating for occlusion of some items.

An additional use of the present invention is in determining depth of items relative to each other within the light field. This is useful in the 3D rendering of images. Preferably, this 2D to 3D rendering makes use of a graph-cut algorithm that incorporates the epsilon stereo constraints discussed above.

Figure 25:
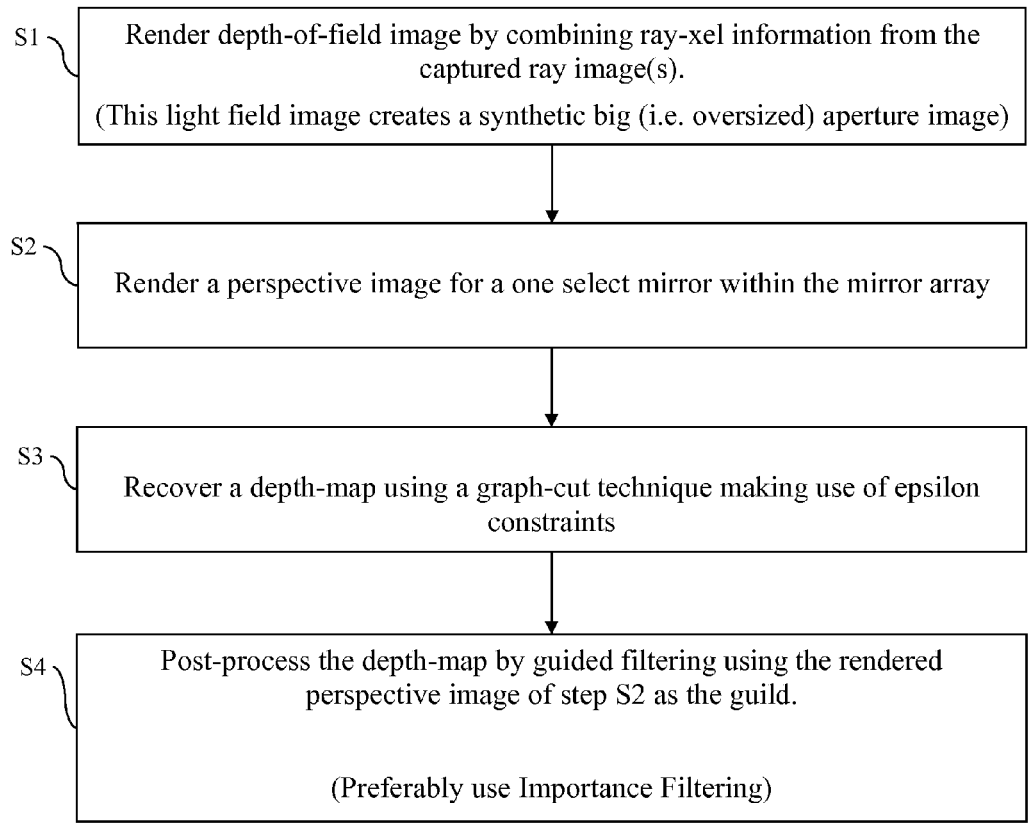
FIG. 25 is a block diagram illustrating the rendering of a 3D image using ray images in accord with the present invention.

With reference to FIG. 25, after creating the ray image(s), a first step in 2D to 3D rendering is to render a depth-of-field image (i.e. a light field image) (step S1). This step combines the ray-xel contributions from all the mirrors and effectively creates a synthetic big aperture image because of the big variation in the field-of-vision provided by the mirror array. An example of this step is shown in FIG. 24.

Figure 26:
FIG. 26 illustrates a rendered perspective image of a selected mirror in mirror array 100 of FIG. 15.

Next, one mirror in mirror array 100 may then be selected, and a perspective image for that one mirror is rendered (step S2). An example of such a perspective image is shown in FIG. 26. In one embodiment of the present invention, rendering of the perspective image preferably makes use the epsilon constraint, as discussed above with reference to FIGS. 16-20A/20B. In order to produce a true 3D image, one needs a depth-map to establish the relative depth-position of imaged objects in a 3D scene. A preferred method of defining the depth-map is by use of a graph-cut technique.

Graph-cut based algorithms for visual correspondence can produce high accuracy and stable reconstructions, although they typically assume the existence of epipolar geometry. As an example, a discussion of computing visual correspondence using graph cuts is provided in "Computing Visual Correspondence with Occlusions via Graph Cuts", by Kolmogorov et al., in ICCV, pages 508-515, 2001, herein incorporated in its entirety by reference.

As is explained above, a pair of multi-perspective cameras in generally would not satisfy the epipolar constraint. However, by means of the epsilon stereo constraint, the present invention extends stereo matching to multi-perspective cameras. By the present approach, it is possible to model a general stereo constraint for catadioptric systems. Furthermore, this general stereo constraint is not restricted to central-catadioptric systems (such as those having spherical mirrors).

A brute-force approach to use the epsilon stereo constraint is to modify classical stereo matching such as Graph-Cut or Belief Propagation by extending the disparity label set to two dimensions. Recall that all pixels in a row in one image view map to an ±ε band around the same row in another image view, where ε is bounded and usually very small. Therefore, one can simply use a 2D search space in standard stereo matching. The downside of this approach, however, is that the corresponding rays under such labeling can be arbitrarily oblique and might not map to a 3D point.

Figure 27:
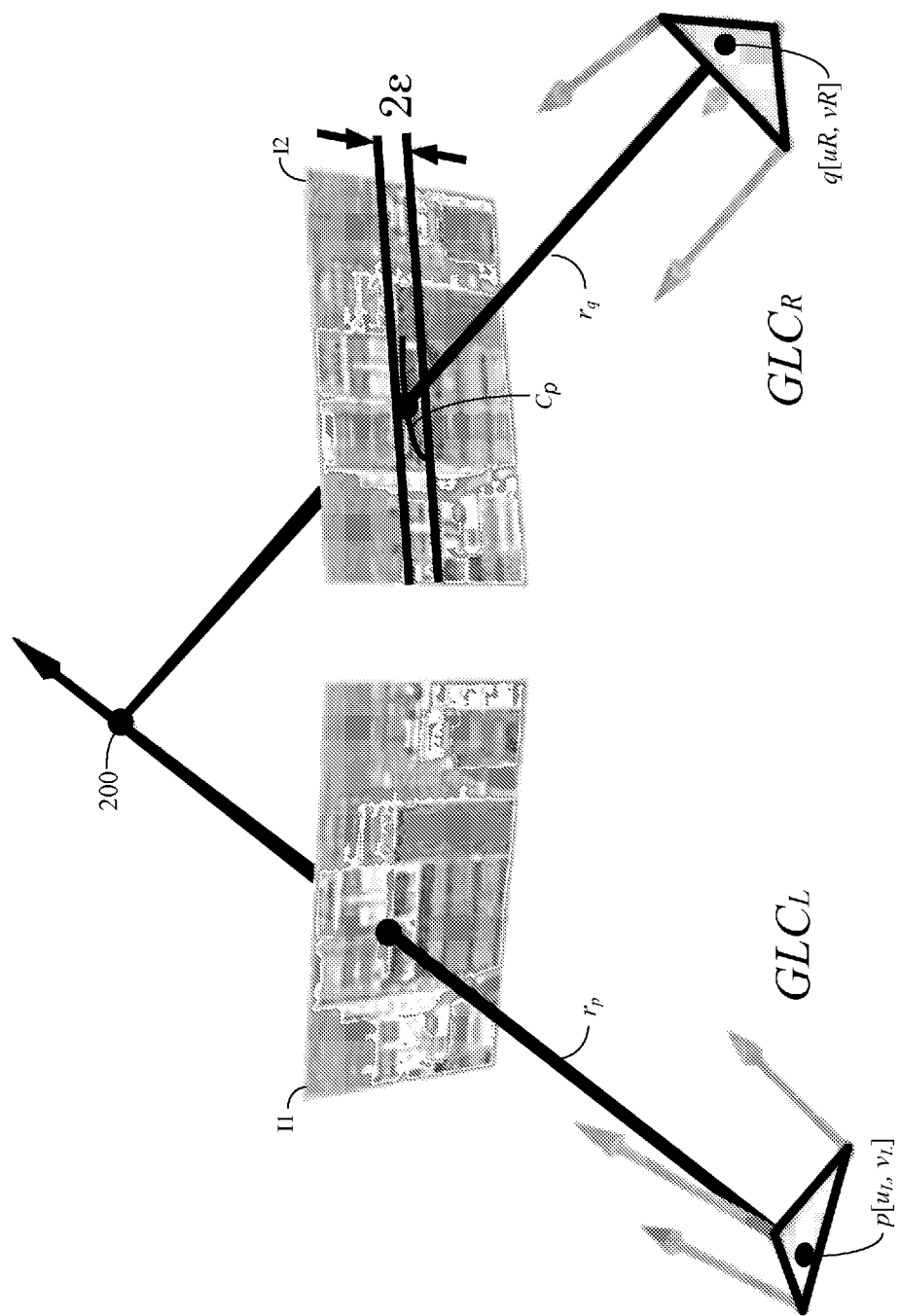
FIG. 27 illustrates the incorporation of epsilon stereo constraints into a graph cut technique.

To enforce coherent epipolar geometry, it is preferred that an additional penalty term be added to measure the "closeness" between two rays. With reference to FIG. 27, for ease of illustration two flat images I1 and I2 from two view angles are shown. It is to be understood that images taken in a catadioptric system would be distorted. The proceeding discussion builds on the above discussion of the General Linear Camera (GLC) model. It is noted that for each pixel p[$u_L$, $v_L$] in a left-view reference camera $GLC_L$ (i.e. a first image view from a first curved mirror), its corresponding ray $r_p=[\sigma_L, \tau_L, u_L, v_L]$ is first computed from p, where $\sigma_L$, $\tau_L$, describe the ray direction at pixel p. In a preferred embodiment, this ray direction corresponds to the mirror-incident ray direction and may be taken directly from ray-xel information in a ray image. However, it may also be determined from the GLC model, as follows:

$$\sigma(u,v)=(1-u-v)\cdot\alpha_1+u\cdot\sigma_2+v\cdot\sigma_3 \quad (6)$$

$$\tau(u,v)=(1-u-v)\cdot\tau_1+u\cdot\tau_2+v\cdot\tau_3$$

Ray $r_p$ is then projected in the right-view camera $GLC_R$ (i.e. a second image view from a second curved mirror).

GLC provides a closed-form projection for a 3D ray $r_p$. Assuming $r_p$ is not parallel to the uv plane, $r_p$ will intersect the uv plane at [u0,v0,0] and have direction [σ0, τ0, 1]. All rays passing through $r_p$ satisfy:

$$[u,v,0]+\lambda 1[\sigma,\tau,1]=[u0,v0,0]+\lambda 2[\sigma 0,\tau 0,1]$$

Eliminating $\lambda_1$ and $\lambda_2$, one has:

$$(u-u0)(\tau-\tau 0)-(v-v0)(\sigma-\sigma 0)=0 \quad (7)$$

Using equation (6), σ, τ of equation (7) may be replaced with u, v as:

$$(u-u0)((1-u-v)\tau 1+u\tau 2+v\tau 3-\tau 0)-(v-v0)((1-u-v)\sigma 1+u\sigma 2+v\sigma 3-\sigma 0)=0 \quad (8)$$

Thus $r_p$ projects to a conic curve $C_p$ in the GLC.

Therefore, the projecting ray in the right-view camera $GLC_R$ (i.e. a second image view from a second curved mirror) is a curve $C_p$. Consequently, to measure how well a pixel q[$u_R$, $v_R$] in $GLC_R$ matches p[uL, vL], one measures both the color consistency between p and q and the distance from q to Cp. Notice that if the corresponding rays $r_p$ and $r_q$ from p and q intersect at a point 200 in 3D space, q should lie on Cp and the distance from q to Cp should ideally be zero. In catadioptric applications, this distance is not typically zero. In the present implementation, therefore, this distance is computed by finding the closest point on Cp to q, and this distance is identified as re-projection distance $D_{reproj}$(p,q).

Finally, the epsilon stereo matching problem is formulated as a 2D disparity labeling problem. The search domain for each pixel p in $GLC_L$ is defined as a window of height 2ε and width $d_{max}^x$ in $GLC_R$, where $d_{max}^x$ is the maximum horizontal disparity and ε is computed from the GLCs parameters. The energy function is defined for a specific labeling f as:

$$E(f)=E_d(f)+E_{occ}(f)+E_s(f)+E_{reproj}(f) \quad (9)$$

The first three terms are commonly used in classical stereo matching: a data term $E_d$ to measure color consistency, an occlusion term $E_{occ}$, and a smoothness term $E_s$. The last term, $E_{reproj}$(f), is the above-mentioned, additional penalty term that measures the "closeness" between two rays. More specifically, it measures the sum of the closest point on Cp to q (identified as p and p+[dx,dy]) for all points in a ray image, and is defined as the re-projection error term $E_{reproj}$, i.e., $$Ereproj(d_x, d_y) = \sum_u \sum_v Dreproj(p, p+[dx, dy]) \quad (10)$$

Figure 28:
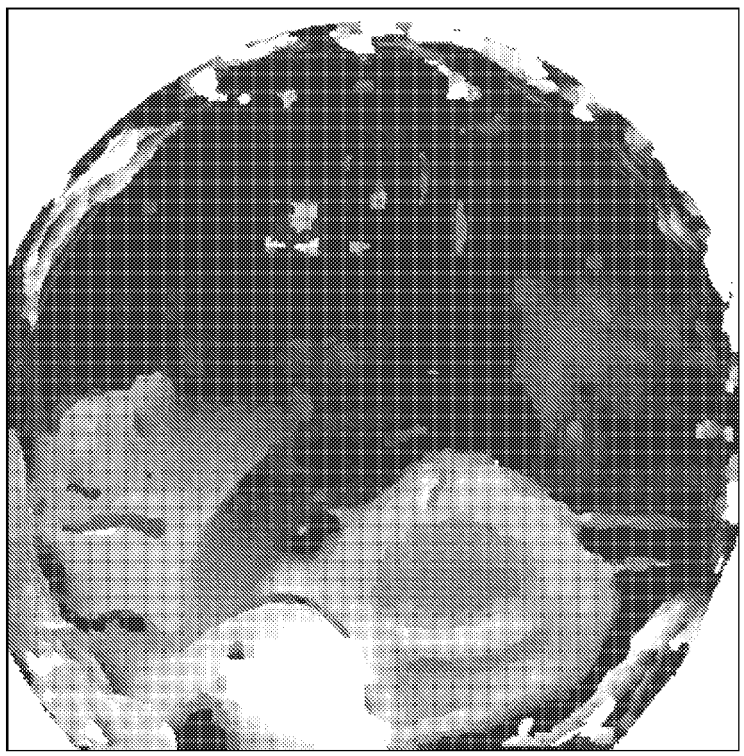
FIG. 28 illustrates an initial depth map.
Figure 29:
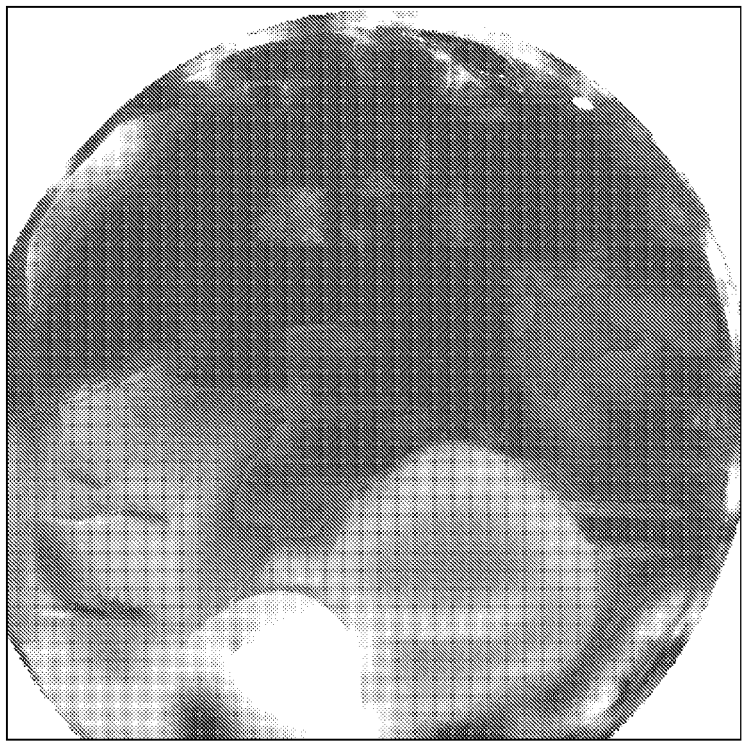
FIG. 29 illustrates a final depth map after guide filtering the depth map of FIG. 28 using the perspective image of FIG. 26 as the guide.

Using this approach, a depth-map recovered using the graph-cut technique (step S3) is shown in FIG. 28.

This depth-map is then post-processed by guided filtering (step S4), preferably using perspective image of FIG. 25 is used as the guide. Information on guided filters can be found in "Guided Image Filtering", by He et al., *ECCV*, pages 1-8, 2010, herein incorporated in its entirety by reference. Further preferably, step S4 utilizes importance filtering, as disclosed in Importance Filtering for Image Retargeting, U.S. patent application Ser. No. 13/099,228, assigned to the same assignee as the present invention, and herein incorporated in its entirety by reference.

This results in a more accurate depth-mapped image, as shown in FIG. 28.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A catadioptric camera system, comprising:
a plurality of curved mirrors arranged into a mirror array for reflecting a desired 3D scene;
a digital imaging system for capturing ray images of said curved mirrors, each of said ray images being a two-dimensional array of ray-structure picture-elements, i.e. ray-xels, each respective ray-xel having ray-xel data including a light intensity measure according to a pre-defined color model, mirror-reflection location information, and mirror-incident ray direction information, wherein:
said light intensity measure is indicative of the light intensity received at said respective ray-xel;
said mirror-reflection location information is indicative of a surface location on a corresponding curved mirror from which a reflected light ray travels from said corresponding curved mirror to said respective ray-xel, said reflected light ray being a reflection of an incident light ray from a point in said 3D scene to said surface location; and
said mirror-incident ray direction information is indicative of the ray direction of said incident light ray from said point in said 3D scene to said surface location.

2. The catadioptric camera system of claim 1, wherein said digital imaging system includes a pinhole camera.

3. The catadioptric camera system of claim 1, wherein said digital imaging system is a pinhole camera.

4. The catadioptric camera system of claim 1, wherein each of said ray images corresponds to a separate one of said curved mirrors, and said digital imaging system captures a plurality of said ray images concurrently, wherein more than one ray image renders ray-xel data corresponding to a common point in said 3D scene.

5. The catadioptric camera system of claim 1, wherein said catadioptric camera system is non-central.

6. The catadioptric camera system of claim 1, wherein said curved mirrors have arbitrary curvatures.

7. The catadioptric camera system of claim 1, wherein said mirror-reflection location information is in the form of mirror-reflection location coordinates and said mirror-incident ray direction information is in the form of mirror-incident ray direction coordinates.

8. The catadioptric camera system of claim 1, wherein said digital imaging system renders a light field for said point in said 3D scene by combining ray-xel data from the ray-xels that corresponds to said point in said 3D scene.

9. The catadioptric camera system of claim 8, wherein the mirror-incident ray direction information of each ray-xel is combined in the formation of said light field.

10. The catadioptric camera system of claim 1, wherein said digital imaging system renders a light field image of said 3D scene by combining all the ray-xel data of all ray-xels in the ray images that correspond to each other.

11. The catadioptric camera system of claim 1, wherein said digital imaging system renders a depth-map from the ray images by:
   (a) rendering a depth-of-field image by combining ray-xel data, from corresponding ray-xels in the captured ray images;
   (b) rendering a perspective image for a selected one of said curved mirrors;
   (c) recovering a depth-map using a graph-cut technique; and
   (d) post-processing the depth-map by guided filtering using the rendered perspective image as the guide.

12. The catadioptric camera system of claim 11, wherein step (c) includes:
   defining a search domain for each ray-xel in a first ray image as a window of height $2\epsilon$ and width $d_{max}^{x}$ in a second ray image, where $d_{max}^{x}$ is a maximum horizontal disparity and $\epsilon$ is an elongation distortion on said second ray image of a point p in said first ray image;
   defining the energy function for a specific labeling f as:

$$E(f) = E_d(f) + E_{occ}(f) + E_s(f) + E_{reproj}(f)$$

where $E_d$ is a data term to measure color consistency, $E_{occ}$ is an occlusion term, $E_s$ is a smoothness term, and $E_{reproj}$ defines a re-projection error as $$E_{reproj}(d_x, d_y) = \sum_u \sum_v Dreproj(p, p+[dx, dy]) \text{ and } \sum_u \sum_v Dreproj(p, p+[dx, dy])$$

determines the sum of the closest distances from point p to p+[dx,dy] for all points in a ray image.

13. A method of rendering a light field in a catadioptric camera, comprising:
   providing a plurality of curved mirrors arranged into a mirror array for reflecting a desired 3D scene;
   providing a digital imaging system for capturing ray images of said curved mirrors, each of said ray images being a two-dimensional array of ray-structure picture-elements, i.e. ray-xels, each respective ray-xel having ray-xel data including a light intensity measure according to a predefined color model, mirror-reflection location information, and mirror-incident ray direction information, wherein:
   said light intensity measure is indicative of the light intensity received at said respective ray-xel;
   said mirror-reflection location information is indicative of a surface location on a corresponding curved mirror from which a reflected light ray travels from said corresponding curved mirror to said respective ray-xel, said reflected light ray being a reflection of an incident light ray from a point in said 3D scene to said surface location; and
   said mirror-incident ray direction information is indicative of the ray direction of said incident light ray from said point in said 3D scene to said surface location; and
   combining at least partial ray-xel data from each of multiple ray-xels that corresponds to said point in said 3D scene.

14. The method of claim 13, wherein:
   said 3D scene is comprised of a plurality of said points, each of said points is simultaneously reflected in more than one of said curved mirrors, and each of said points corresponds to a distinct ray-xel in a plurality of the ray images of the curved mirrors; and
   said light field is rendered by combining the mirror-incident ray direction information from groups of corresponding ray-xels, the corresponding ray-xels in each group corresponding to a commonly captured one of said points in said 3D scene.

15. The method of claim 13, wherein said light field is rendered by combining all the ray-xel data of the ray-xels in the ray images that correspond to each other.

16. The method of claim 13, wherein said catadioptric camera system is non-central.

17. The method of claim 13, wherein said curved mirrors have arbitrary curvatures.

18. The method of claim 13, wherein said mirror-reflection location information is in the form of mirror-reflection location coordinates and said mirror-incident ray direction information is in the form of mirror-incident ray direction coordinates.

19. The method claim 13, wherein said digital imaging system further renders a depth-map from the ray images by:
   (a) rendering a depth-of-field image by combining ray-xel data from corresponding ray-xels in the captured ray images;
   (b) rendering a perspective image for a selected one of said curved mirrors;
   (c) recovering a depth-map using a graph-cut technique; and
   (d) post-processing the depth-map by guided filtering using the rendered perspective image as the guide.

20. The method of claim 19, wherein step (c) includes:
   defining a search domain for each ray-xel in a first ray image as a window of height $2\epsilon$ and width $d_{max}^{x}$ in a second ray image, where $d_{max}^{x}$ is a maximum horizontal disparity and $\epsilon$ is an elongation distortion on said second ray image of a point p in said first ray image;
   defining the energy function for a specific labeling f as:

$$E(f) = E_d(f) + E_{occ}(f) + E_s(f) + E_{reproj}(f)$$

where $E_d$ is a data term to measure color consistency, $E_{occ}$ is an occlusion term, $E_s$ is a smoothness term, and $E_{reproj}$ defines a re-projection error as $$E_{reproj}(d_x, d_y) = \sum_u \sum_v Dreproj(p, p+[dx, dy]) \text{ and } \sum_u \sum_v Dreproj(p, p+[dx, dy])$$

determines the sum of the closest distances from point p to p+[dx,dy] for all points in a ray image.

* * * * *